US007283556B2

(12) United States Patent
Mullendore et al.

(10) Patent No.: US 7,283,556 B2
(45) Date of Patent: Oct. 16, 2007

(54) METHOD AND SYSTEM FOR MANAGING TIME DIVISION MULTIPLEXING (TDM) TIMESLOTS IN A NETWORK SWITCH

(75) Inventors: Rodney N. Mullendore, San Jose, CA (US); Stuart F. Oberman, Sunnyvale, CA (US); Anil Mehta, Milpitas, CA (US); Keith Schakel, San Jose, CA (US); Kamran Malik, San Jose, CA (US)

(73) Assignee: Nishan Systems, Inc., Broomfield, CO (US)

( * ) Notice: Subject to any disclaimer, the term of this patent is extended or adjusted under 35 U.S.C. 154(b) by 1134 days.

(21) Appl. No.: 10/209,158

(22) Filed: Jul. 31, 2002

(65) Prior Publication Data

US 2003/0026287 A1 Feb. 6, 2003

Related U.S. Application Data

(60) Provisional application No. 60/309,152, filed on Jul. 31, 2001.

(51) Int. Cl.
*H04L 12/43* (2006.01)
(52) U.S. Cl. ...................... 370/458; 370/442
(58) Field of Classification Search ............... 370/442, 370/401; 365/230.05; 709/231; 279/4.1
See application file for complete search history.

(56) References Cited

U.S. PATENT DOCUMENTS 4,330,857 A 5/1982 Alvarez, III et al.

| 5,561,669 | A | | 10/1996 | Lenney et al. |
| 6,021,086 | A | * | 2/2000 | Joffe ...................... 365/230.05 |
| 6,353,618 | B1 | | 3/2002 | Hung et al. |
| 6,913,268 | B2 | * | 7/2005 | Bohler ........................ 279/4.1 |
| 6,954,463 | B1 | * | 10/2005 | Ma et al. ..................... 370/401 |
| 2001/0049740 | A1 | * | 12/2001 | Karpoff ...................... 709/231 |

* cited by examiner

*Primary Examiner*—Chi Pham
*Assistant Examiner*—Albert T. Chou
(74) *Attorney, Agent, or Firm*—Hensley Kim & Holzer, LLC

(57) ABSTRACT

A system and method for managing the allocation of Time Division Multiplexing (TDM) timeslots in a network switch. The network switch may use a TDM cycle comprising multiple timeslots to manage shared resources and to schedule data ingress and egress through the ports of the current configuration, wherein each port is assigned one or more timeslots. The network switch may be reprogrammed to support one of multiple timeslot assignment schemes for one of multiple port configurations. The network switch may support configurations with varying numbers of ports, e.g. 8- and 16-port configurations. A network switch may also support configurations where two or more ports are combined to form one port, for example, a 2 Gbs Fibre Channel port. To meet the requirements of the various configurations, the timeslot assignment scheme may be reprogrammed to meet the scheduling requirements of each of the possible port configurations.

41 Claims, 18 Drawing Sheets

| Field Name | Size (in bits) | Description |
|---|---|---|
| Queue Count 490A | 5 | This field is the number of output queues that contain this packet. When a packet is received, this field is initially set to the number of output queues on which the packet is inserted. This value is the number of 1 bits (i.e., asserted bits) in the port mask of the flow descriptor (after the source port has been removed from the mask). This field will be decremented as each output queue transmits the packet until the count reaches 0 when the packet (descriptor and cell memory) will be freed. This field may be stored in a separate queue count memory. |
| Cluster Count 490B | 7 | This field stores the number of clusters used by the packet. This is used by the read stored packet Manager to indicate how many clusters are to be freed when a packet is either read out or discarded. |
| Input Flow Number 490C | 10 | This field is used to track resources per flow and to update resources when the packet is freed. |
| Threshold Group / Virtual Channel Number 490D | 5 | This field is used to track resources per threshold group and to update resources when the packet is freed. The MSB (most significant bit) of this field indicates if the lower bits are group or VC (virtual channel) number: 1 = threshold group (4 bits)   0 = VC number (3 bits) |
| Cell List Head 490E | 15 | This field points to the first cell (cluster) of the packet's data. Note a linked list of cells (clusters) holds the packet data. |
| Cell List Tail 490F | 15 | This field points to the last cell (cluster) of the packet's data. Note a linked list of cells (clusters) holds the packet data. |
| Tail Valid 490G | 1 | This field indicates whether the packet has completely been written to memory as of the time that the packet descriptor is written, and thus whether the tail cell pointer is valid. This is used by the read stored packet manager in the case of an early-forwarded packet. |
| Error Detected 490H | 1 | This field indicates whether any error has been detected by the fabric before writing to memory. This bit is the ERR (error) bit of the packet. It is written at the end of a packet, when the Cell List Tail and Tail Valid signals are updated. For multiple cell packets, this bit is cleared on the first write of the packet descriptor. |
| To Be Dropped 490I | 1 | This bit indicates that the packet is to be dropped when it is scheduled. This occurs for packets when resources are depleted after it has already begun to be written to memory. In some embodiments it may be guaranteed that this packet is never early-forwarded, and thus can be dropped when it is started to be read. |
| Source Port 490J | 5 | This field contains the port from which the packet was received. This value is used when a packet is freed to adjust the resource allocation fields in the appropriate input port descriptor. |
| High Priority 490K | 1 | This field indicates if the packet is high priority. If this bit is set, the packet is not subject to thresholding. The packet is only dropped if there are no more "non-VC" (non-virtual channel) resources available. |

Figure 2

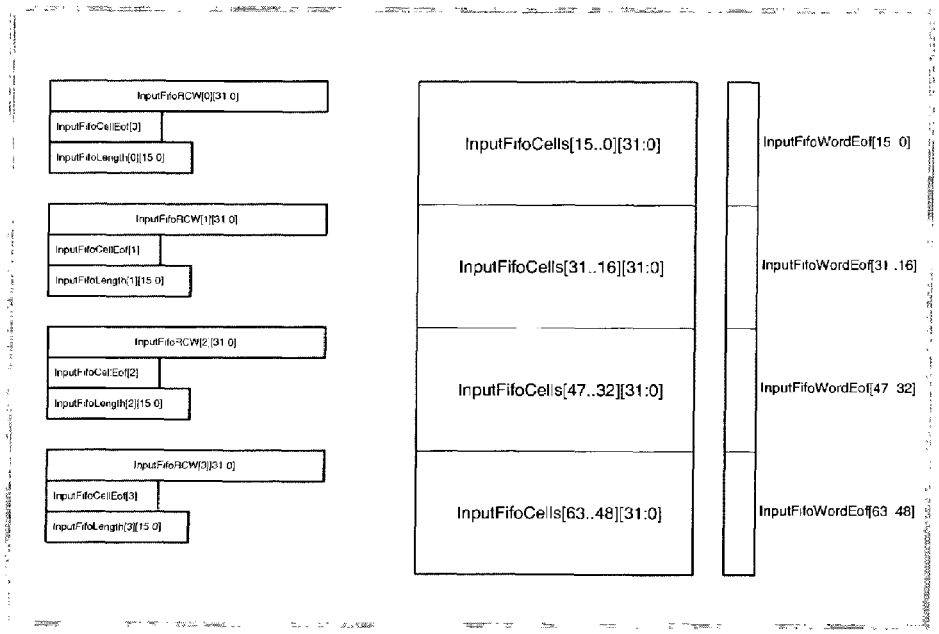

Figure 5 – Input FIFO Structure

| FIFO Pointer | Function |
|---|---|
| HeadCellPtr[1:0] | Points to the current head cell |
| TailCellPtr[1:0] | Points to the current tail cell |
| SavedFirstCellPtr[1:0] | Points to the saved first cell for the currently read packet |
| WriteWordPtr[3:0] | Points to the word within the tail cell that is being written to |
| SfReadWordPtr[3:0] | Points to the word within the head cell that is being read from for store and forward; this pointer is always synchronized to a given port's 52MHz TDM slot |
| CtReadWordPtr[3:0] | Points to the word within the head cell that is being read from for cut-through |

Figure 6 – Input FIFO Pointers

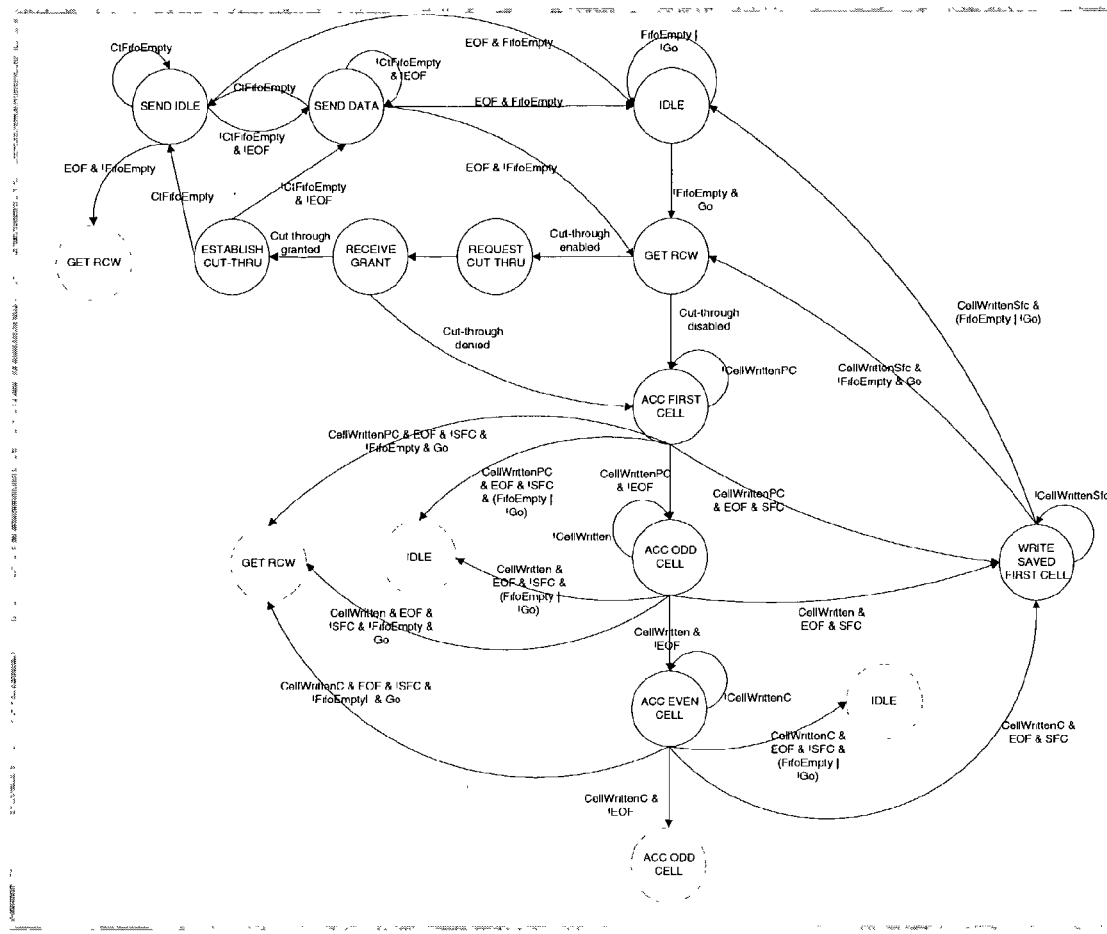
Figure 7 – Input FIFO Read Manager State Machine

Figure 9 – SRAM Address Bus Configuration

Logical View of Switch Fabric

Shared Memory Block Diagram

TDM Cycle Timeslot Allocation

Figure 16
Time Slot Assignment (16-Port Mode)

| Timeslot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|---|---|---|---|---|
| Port | 0 | 8 | 1 | 9 | 2 | 10 | 3 | 11 | 4 | 12 | 5 | 13 | 6 | 14 | 7 | 15 | | 0 | 8 | 1 | 9 | 2 | 10 | 3 | 11 | 4 | 12 | 5 | 13 | 6 | 14 | 7 | 15 | |

Read Timeslots — Bus Turnaround — Write Timeslots — Bus Turnaround

Figure 17
Time Slot Assignment (8-Port Mode)

| Timeslot | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|---|---|---|---|---|---|---|---|---|---|---|---|---|---|---|---|---|
| Port | 0 | 0 | 1 | 1 | 2 | 2 | 3 | 3 | 4 | 4 | 5 | 5 | 6 | 6 | 7 | 7 | | 0 | 0 | 1 | 1 | 2 | 2 | 3 | 3 | 4 | 4 | 5 | 5 | 6 | 6 | 7 | 7 | |

Read Timeslots — Bus Turnaround — Write Timeslots — Bus Turnaround

Double Speed Port Processing

Double Speed Port Processing

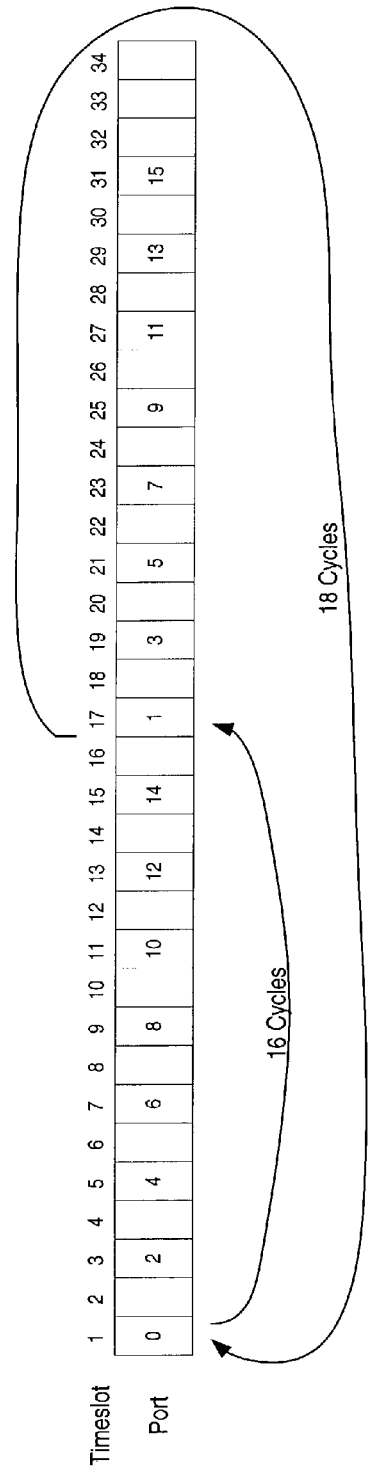

| TDM Slot # | SRAM | Packet Received | Read Packet Begin | Read Packet Done | Input FIFO CLM Read (allocate) (4 per chip) | Read Manager CLM Write (link) (4 per chip) | Read Manager CLM Read / Write | PDQ Read (4 per chip) | PDQ Write | PDM Read | PDM Write | QCOUNT Write | QCOUNT Read | QCOUNT Write (4 per chip) |
|---|---|---|---|---|---|---|---|---|---|---|---|---|---|---|
| 0 | 0 | | 0 | 11 | 2,6,10,14 | | | 2,6,10,14 | | | | | | |
| 1 | 8 | | | | | | | | | | | 11 | 13 | |
| 2 | 1 | 0 | 2 | 13 | | | | | | | | | | |
| 3 | 9 | | | | | | 0 | | 0 | 0 | | 13 | 15 | |
| 4 | 2 | 2 | 4 | 15 | | | | | | | | | | |
| 5 | 10 | | | | | | 2 | | 2 | 2 | | 15 | | |
| 6 | 3 | 4 | 6 | | | 0,4,8,12 | | | | | 0,4,8,12 | | | 0,4,8,12 |
| 7 | 11 | | | | | | 4 | | 4 | 4 | | | 0 | |
| 8 | 4 | 6 | 8 | 0 | | 2,6,10,14 | | | | 2,6,10,14 | | | 2,6,10,14 |
| 9 | 12 | | | | | | 6 | | 6 | 6 | | 0 | 2 | |
| 10 | 5 | 8 | 10 | 2 | | | | | | | | | | |
| 11 | 13 | | | | | | 8 | | 8 | 8 | | 2 | 4 | |
| 12 | 6 | 10 | 12 | 4 | | | | | | | | | | |
| 13 | 14 | | | | | | 10 | | 10 | 10 | | 4 | 6 | |
| 14 | 7 | 12 | 14 | 6 | 1,5,9,13 | | | 1,5,9,13 | | | | | | |
| 15 | 15 | | | | | | 12 | | 12 | 12 | | 6 | 8 | |
| 16 | TAR | 14 | 1 | 8 | 3,7,11,15 | | | 3,7,11,15 | | | | | | |
| 17 | 0 | | | | | | 14 | | 14 | 14 | | 8 | 10 | |
| 18 | 8 | 1 | 3 | 10 | | | | | | | | | | |
| 19 | 1 | | | | | | 1 | | 1 | 1 | | 10 | 12 | |
| 20 | 9 | 3 | 5 | 12 | | | | | | | | | | |
| 21 | 2 | | | | | | 3 | | 3 | 3 | | 12 | 14 | |
| 22 | 10 | 5 | 7 | 14 | | 1,5,9,13 | | | | | 1,5,9,13 | | | 1,5,9,13 |
| 23 | 3 | | | | | | 5 | | 5 | 5 | | 14 | 1 | |
| 24 | 11 | 7 | 9 | 1 | | 3,7,11,15 | | | | | 3,7,11,15 | | | 3,7,11,15 |
| 25 | 4 | | | | | | 7 | | 7 | 7 | | 1 | 3 | |
| 26 | 12 | 9 | 11 | 3 | | | | | | | | | | |
| 27 | 5 | | | | | | 9 | | 9 | 9 | | 3 | 5 | |
| 28 | 13 | 11 | 13 | 5 | | | | | | | | | | |
| 29 | 6 | | | | | | 11 | | 11 | 11 | | 5 | 7 | |
| 30 | 14 | 13 | 15 | 7 | | | | | | | | | | |
| 31 | 7 | | | | | | 13 | | 13 | 13 | | 7 | 9 | |
| 32 | 15 | 15 | | 9 | 0,4,8,12 | | | 0,4,8,12 | | | | | | |
| 33 | TAR | | | | | | 15 | | 15 | 15 | | 9 | 11 | |

FIG. 20

Time-slots for Input Blocks

| TDM Slot # | Packet Received | Read Packet / Discard | Read Packet Done | QDM R | QDM W | QLM R | QLM W | TTM R | TTM W | CPU Discard QDM R | CPU Discard QDM W | Schedule Begin |
|---|---|---|---|---|---|---|---|---|---|---|---|---|
| 0 |  | 0 | 11 | S2 |  |  |  | T |  |  |  |  |
| 1 |  |  |  | 15 | S0 | S2 | C13 |  | 15 | C15 | C13 | 4 |
| 2 | 0 | 2 | 13 | S4 | 15 |  | 15 | T |  |  |  |  |
| 3 |  |  |  |  | S2 | S4 | C15 |  |  | C0 | C15 | 6 |
| 4 | 2 | 4 | 15 | S6 |  |  |  | T |  |  |  |  |
| 5 |  |  |  | 0 | S4 | S6 | C0 |  | 0 | C2 | C0 | 8 |
| 6 | 4 | 6 |  | S8 | 0 |  | 0 | T |  |  |  |  |
| 7 |  |  |  |  | 2 | S6 | S8 | C2 |  | 2 | C4 | C2 | 10 |
| 8 | 6 | 8 | 0 | S10 | 2 |  | 2 | T |  |  |  |  |
| 9 |  |  |  |  | 4 | S8 | S10 | C4 |  | 4 | C6 | C4 | 12 |
| 10 | 8 | 10 | 2 | S12 | 4 |  | 4 | T |  |  |  |  |
| 11 |  |  |  |  | 6 | S10 | S12 | C6 |  | 6 | C8 | C6 | 14 |
| 12 | 10 | 12 | 4 | S14 | 6 |  | 6 | T |  |  |  |  |
| 13 |  |  |  |  | 8 | S12 | S14 | C8 |  | 8 | C10 | C8 | 1 |
| 14 | 12 | 14 | 6 | S1 | 8 |  | 8 | T |  |  |  |  |
| 15 |  |  |  |  | 10 | S14 | S1 | C10 |  | 10 | C12 | C10 | 3 |
| 16 | 14 | 1 | 8 | S3 | 10 |  | 10 | T |  |  |  |  |
| 17 |  |  |  |  | 12 | S1 | S3 | C12 |  | 12 | C14 | C12 | 5 |
| 18 | 1 | 3 | 10 | S5 |  |  | 12 | T |  |  |  |  |
| 19 |  |  |  |  | 14 | S3 | S5 | C14 |  | 14 | C1 | C14 | 7 |
| 20 | 3 | 5 | 12 | S7 | 14 |  | 14 | T |  |  |  |  |
| 21 |  |  |  |  | 1 | S5 | S7 | C1 |  | 1 | C3 | C1 | 9 |
| 22 | 5 | 7 | 14 | S9 | 1 |  | 1 | T |  |  |  |  |
| 23 |  |  |  |  | 3 | S7 | S9 | C3 |  | 3 | C5 | C3 | 11 |
| 24 | 7 | 9 | 1 | S11 | 3 |  | 3 | T |  |  |  |  |
| 25 |  |  |  |  | 5 | S9 | S11 | C5 |  | 5 | C7 | C5 | 13 |
| 26 | 9 | 11 | 3 | S13 | 5 |  | 5 | T |  |  |  |  |
| 27 |  |  |  |  | 7 | S11 | S13 | C7 |  | 7 | C9 | C7 | 15 |
| 28 | 11 | 13 | 5 | S15 | 7 |  | 7 | T |  |  |  |  |
| 29 |  |  |  |  | 9 | S13 | S15 | C9 |  | 9 | C11 | C9 |  |
| 30 | 13 | 15 | 7 |  | 9 |  | 9 | T |  |  |  |  |
| 31 |  |  |  | 11 | S15 |  | C11 |  | 11 | C13 | C11 | 0 / CPU |
| 32 | 15 |  | 9 | S0 | 11 |  | 11 | T | CPU |  |  |  |
| 33 |  |  |  |  | 13 |  | S0 |  |  | 13 |  |  | 2 |

FIG. 21

Time-slots for Output Blocks

METHOD AND SYSTEM FOR MANAGING TIME DIVISION MULTIPLEXING (TDM) TIMESLOTS IN A NETWORK SWITCH

CROSS-REFERENCE TO RELATED APPLICATIONS

This application claims the benefit of U.S. Provisional Application No. 60/309,152, filed Jul. 31, 2001.

BACKGROUND OF THE INVENTION

1. Field of the Invention

The present invention generally relates to the field of network switches. More particularly, the present invention relates to a system and method for managing the allocation of Time Division Multiplexing (TDM) timeslots in a network switch.

2. Description of the Related Art

In enterprise computing environments, it is desirable and beneficial to have multiple servers able to directly access multiple storage devices to support high-bandwidth data transfers, system expansion, modularity, configuration flexibility, and optimization of resources. In conventional computing environments, such access is typically provided via file system level Local Area Network (LAN) connections, which operate at a fraction of the speed of direct storage connections. As such, access to storage systems is highly susceptible to bottlenecks.

Storage Area Networks (SANs) have been proposed as one method of solving this storage access bottleneck problem. By applying the networking paradigm to storage devices, SANs enable increased connectivity and bandwidth, sharing of resources, and configuration flexibility. The current SAN paradigm assumes that the entire network is constructed using Fibre Channel switches. Therefore, most solutions involving SANs require implementation of separate networks: one to support the normal LAN and another to support the SAN. The installation of new equipment and technology, such as new equipment at the storage device level (Fibre Channel interfaces), the host/server level (Fibre Channel adapter cards) and the transport level (Fibre Channel hubs, switches and routers), into a mission-critical enterprise computing environment could be described as less than desirable for data center managers, as it involves replication of network infrastructure, new technologies (i.e., Fibre Channel), and new training for personnel. Most companies have already invested significant amounts of money constructing and maintaining their network (e.g., based on Ethernet and/or ATM). Construction of a second high-speed network based on a different technology is a significant impediment to the proliferation of SANs. Therefore, a need exists for a method and apparatus that can alleviate problems with access to storage devices by multiple hosts, while retaining current equipment and network infrastructures, and minimizing the need for additional training for data center personnel.

In general, a majority of storage devices currently use "parallel" SCSI (Small Computer System Interface) or Fibre Channel data transfer protocols whereas most LANs use an Ethernet protocol, such as Gigabit Ethernet. SCSI, Fibre Channel and Ethernet are protocols for data transfer, each of which uses a different individual format for data transfer. For example, SCSI commands were designed to be implemented over a parallel bus architecture and therefore are not packetized. Fibre Channel, like Ethernet, uses a serial interface with data transferred in packets. However, the physical interface and packet formats between Fibre Channel and Ethernet are not compatible. Gigabit Ethernet was designed to be compatible with existing Ethernet infrastructures and is therefore based on an Ethernet packet architecture. Because of these differences there is a need for a new system and method to allow efficient communication between the three protocols.

One such system and method is described in the U.S. patent application titled "METHOD AND APPARATUS FOR TRANSFERRING DATA BETWEEN IP NETWORK DEVICES AND SCSI AND FIBRE CHANNEL DEVICES OVER AN IP NETWORK" by Latif, et al., filed on Feb. 8, 2000 (Ser. No. 09/500,119). This application is hereby incorporated by reference in its entirety. This application describes a network switch that implements a protocol referred to herein as Storage over Internet Protocol (SoIP).

A network switch may work under a number of constraints. It is desirable for a network switch to include ports that support various protocols such as 1 Gbps and 2 Gbps Fibre Channel and Gigabit Ethernet. It is also desirable that the network switch is able to support the fastest packet rates for the one or more protocols supported by the network switch, including worst-case scenarios for packet size, packet rates, etc. In addition, it may be desirable for the network switch to support various port configurations with different numbers of ports (e.g. 8- and 16-port configurations). It is also desirable that the network switch be reprogrammable to support the various protocols, port configurations, and combinations thereof.

Thus, it would be advantageous for a network switch to be able to schedule the servicing of the various ports supporting the various protocols with a mechanism or mechanisms to best satisfy the above constraints.

SUMMARY

The problems set forth above may at least in part be solved by a system and method for managing the assignment of Time Division Multiplexing (TDM) timeslots in a TDM cycle of a network switch. A network switch may include a plurality of ports including one or more input ports, one or more output ports, and/or one or more input/output ports. The network switch may be dynamically reprogrammable to support one of a plurality of timeslot assignment schemes for one or more of a plurality of port configurations. A port configuration may include a subset of the plurality of ports of the network switch. The subset may include a portion or all of the plurality of ports of the network switch. In one embodiment, two or more ports of the plurality of ports of the network switch may be combined to form one port in a port configuration.

The network switch may also include scheduler logic for making scheduling decisions for ports in the port configurations. The scheduler logic may be coupled to the plurality of ports and the memory, and may be configured to schedule the receiving of input data and the conveying of output data through the plurality of ports using the TDM cycle of the network switch.

The ports in the subset may each support one of the one or more protocols supported by the network switch. A network switch may be programmed to support only ports of one protocol, or alternatively may be programmed to support combinations of ports of two or more protocols. In one embodiment, the network switch may include one or more programmable configuration registers that may be used to dynamically reconfigure a network switch to support one or more types of ports (Gigabit Ethernet, 1 Gbps Fibre Channel, 2 Gbps Fibre Channel, etc.) or combinations of types of ports.

There are a number of resources within the network switch that may be shared both by the ports implemented by a fabric slice and other ports implemented by other fabric slices that collectively make up the network switch fabric. Embodiments of a network switch may use a Time Division Multiplexing (TDM) scheme to efficiently, effectively and consistently utilize these resources. Each port gets a unique TDM timeslot to access the shared critical resources within the network switch. The management and configuration of the TDM timeslots may be changed for different configurations of the network switch to meet the requirements of the configuration and to satisfy the various constraints of the network switch. In one embodiment, TDM timeslot configuration changes may be dynamically performed by modifying the contents of one or more of the configuration registers.

In one embodiment, the network switch may include a packet memory that is a time division multiplexed (TDM) shared memory. TDM accesses into the shared memory, referred to as timeslots, are allocated equally to each port of the switch. In one embodiment, each port has equivalent bandwidth requirements. In addition, the timeslots may be designated as either read timeslots or write timeslots. In one embodiment, the network switch may use a TDM cycle comprising 34 timeslots with 16 read, 16 write, and 2 bus turnaround timeslots for transitioning between read and write operations. Each timeslot represents one clock cycle. In a 16-port configuration, one cell may be read or written during each timeslot excluding the two bus turnaround slots.

Some embodiments of a network switch may support configurations with varying numbers of fabric slices or chips and/or ports. In one embodiment, the network switch may support 8-port and 16-port configurations. The 8-port configuration may use only half as many fabric slices as the 16-port configuration, and requires that the interconnections between the slices be done differently than in the 16-port configuration. For example, in an embodiment with four ports per slice, an 8-port configuration would have two slices and a 16-port configuration four slices. The memory width in the 8-port configuration is halved when compared to the 16-port configuration (e.g. 32 bytes (256 bits) wide instead of 64 bytes (512 bits)). To maintain consistency and simplify the design of the fabric hardware, the 512-bit cell size may be used in the 8-port configuration. Because of the reduction in width of the shared memory in the 8-port configuration, two reads or writes are required to read/write a 512-bit cell. Therefore, each memory read or write will read/write half of a cell, referred to as a subcell. In other words, since there is half as much SRAM (256 bits instead of 512 bits), twice as much time (2 timeslots instead of 1 timeslot) is used per port in 8-port mode as is used in 16-port mode to maintain the required packet rate in 8-port mode. This includes handling of a worst-case scenario, for example, when a packet is less than 64 bytes long, but the overhead added to the packet causes it to be greater than 64 bytes long (e.g., 65 or 66 bytes long).

In one embodiment, the timeslot assignments may be configured to support both the 8-port and 16-port configurations. In the 16-port configuration, a port may write or read data in a single clock cycle. In the 16-port configuration, the timeslots for the first half of the 16 ports may be interleaved with the timeslots for the second half of the 16 ports for both the read and the write timeslots. For the 8-port configuration, the data for each port may be read/written in two consecutive clock cycles, with one subcell read/written per cycle. These timeslot assignments for 8- and 16-port configurations may advantageously require a minimum amount of change between the two configurations. In the 8-port configuration, the shared memory address is supplied for two consecutive clock cycles for each timeslot. Because the second clock cycle is for the second half of a cell, the address will be the same but with the lower address bit a 1 as opposed to a 0 in the first clock cycle.

Some embodiments of a network switch may support double-speed, 2 Gbps (Gigabit per second) Fibre Channel (FC) ports. In one embodiment of a network switch, two 1 Gbps FC ports may be combined to form a 2 Gbps FC port, allowing use of both of their timeslots. In one embodiment, the network switch may support sending and completing a new one-cell packet in each timeslot, or two independent packets in each complete TDM cycle. Thus, a 2 Gbps port receives twice as many cells per TDM cycle as a 1 GBps port.

Some embodiments may support configurations with a combination of 1 Gbps FC and 2 Gbps FC ports enabled simultaneously. For example, in a switch with 16 1 Gbps FC ports, with the ports numbered 0-15, some ports may be combined to form double speed ports and some not combined to remain as 1 Gbps ports. As an example, ports (0/1, 2/3, 4/5, 6/7) may be combined to form four double speed ports, and ports 8-15 may remain as 1 Gbps ports, resulting in 12 configured ports. All other possible combinations of 2 Gbps and 1 Gbps FC ports are contemplated. To allow the scheduler more time in making scheduling decisions for combined ports, one embodiment of a network switch may use a TDM cycle in which the timeslots assigned to the two combined ports are spaced widely apart in the TDM cycle. For example, for a TDM cycle with 32 read/write timeslots and two turnaround slots, there are at least 16 cycles between the assigned timeslots of the combined ports (e.g. ports 0 and 1) as port 0 may be assigned timeslot 0 and port 1 timeslot 17.

BRIEF DESCRIPTION OF THE DRAWINGS

The foregoing, as well as other objects, features, and advantages of this invention may be more completely understood by reference to the following detailed description when read together with the accompanying drawings in which:

FIG. 2 illustrates details of one embodiment of a packet descriptor;

FIG. 5 is a diagram illustrating one embodiment of the structure of the input FIFO from FIG. 1;

FIG. 6 illustrates one embodiment of a set of pointers that maybe used in connection with the input FIFO of FIG. 1;

FIG. 7 illustrates one embodiment of a state machine that may be used to operate the input FIFO from FIG. 1;

FIG. 16 illustrates assignment of timeslots in a TDM cycle for a 16-port network switch according to one embodiment;

FIG. 17 illustrates assignment of timeslots in a TDM cycle for an 8-port network switch according to one embodiment;

FIG. 19A illustrates assignments of timeslots in a TDM cycle for a network switch configured to support 2 Gbps FC ports there are two cycles between combined ports according to one embodiment;

FIG. 19B illustrates assignments of timeslots in a TDM cycle for a network switch configured to support 2 Gbps FC ports in which there are at least 16 cycles between combined ports according to one embodiment;

FIG. 20 is a table illustrating a TDM timeslot distribution scheme for the critical resources shared by an input block for a fully configured 16-port switch according to one embodiment; and FIG. 21 is a table illustrating a TDM timeslot distribution scheme for the critical resources shared by an output block for a fully configured 16-port switch according to one embodiment.

Figure 1:
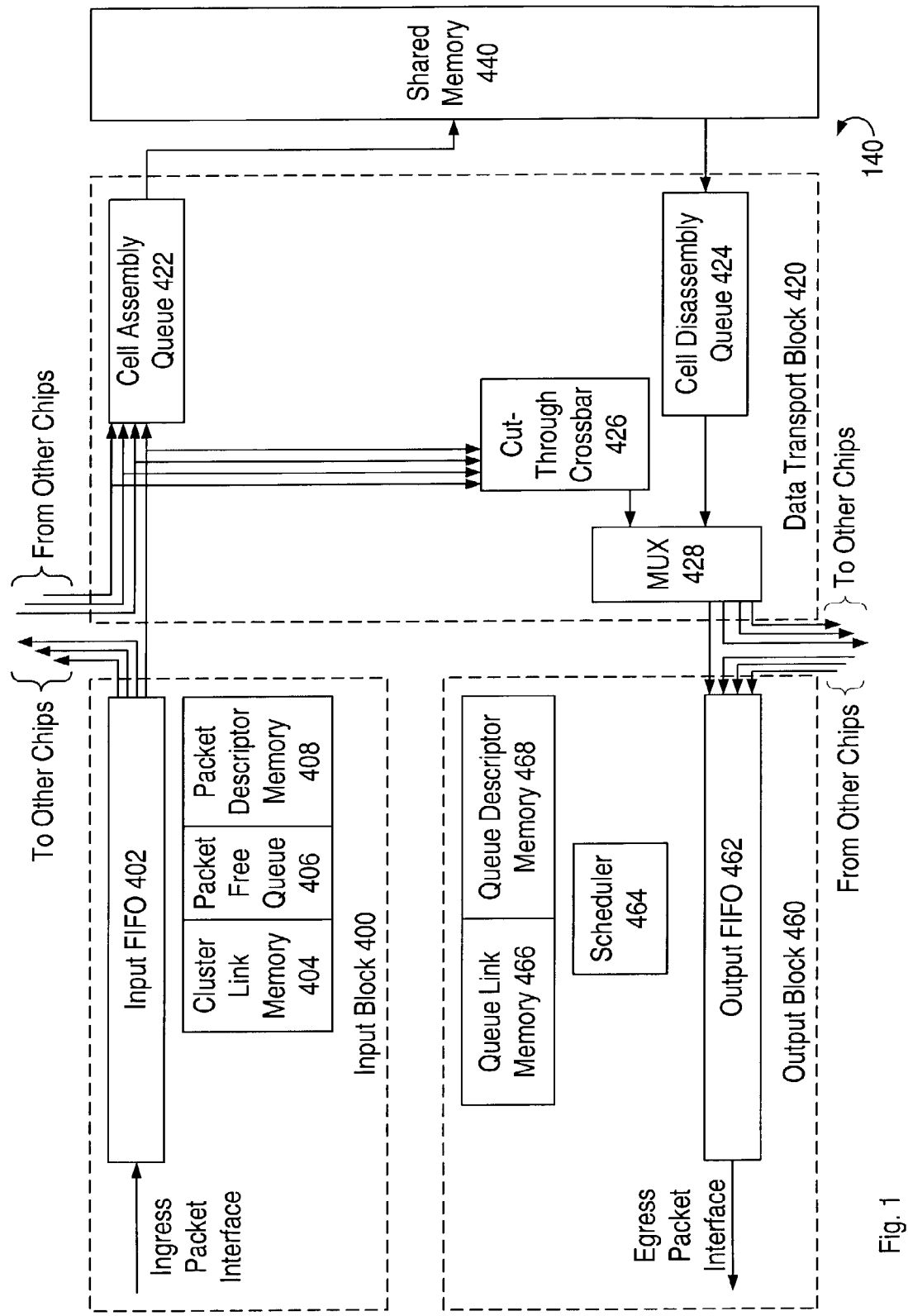
FIG. 1 is a block diagram of a portion of one embodiment of a network switch fabric.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF SEVERAL EMBODIMENTS

Turning now to FIG. 1, a block diagram of a portion of one embodiment of a network switch fabric is shown. In this embodiment, switch fabric portion 140 comprises an input block 400, a data transport block 420, a shared memory 440, and an output block 460. The switch fabric may comprise a plurality of switch fabric portions 140 (e.g., 4 or 8 portions, each having one input port and one output port). In one embodiment, input block 400, data transport block 420 and output block 460 are all implemented on a single chip (e.g., an application specific integrated circuit or ASIC). The switch fabric may include one or more input blocks 400, wherein each input block 400 is configured to receive internal format packet data (also referred to as frames), from which it is then written into an input FIFO 402. Input block 400 may be configured to generate packet descriptors for the packet data and allocate storage within shared memory (i.e., RAM) 440. As will be described in greater detail below, the switch fabric may route the packet data in a number of different ways, including a store-and-forward technique, an early forwarding technique, and a cut-through routing technique.

Input block 400 may further comprise a cluster link memory 404, a packet free queue 406, and a packet descriptor memory 408. Cluster link memory 404 may be configured as a linked list memory to store incoming packets. Packet free queue 406 is configured to operate as a "free list" to specify which memory locations are available for storing newly received packets. In some embodiments, input block 400 may be configured to allocate storage within shared memory 440 using clusters. In this embodiment, a cell is the minimum number of bytes that can be read from or written to shared memory 440 (e.g., 512 bits or 64 bytes). The cell size is a function of the interface with shared memory 440. However, in some embodiments, a number of cells (e.g., two cells) may be defined as a "cluster". Clusters may be used to reduce the number of bits required for tracking and managing packets. Advantageously, by dividing packets into clusters instead of cells, the overhead for each packet may potentially be reduced. For example, in one embodiment shared memory 440 may allocate memory in 128-byte clusters. The cluster size may be selected based on a number of factors, including the size of shared memory 440, the average and maximum packet size, and the size of packet descriptor memory 408. However, the potential disadvantage is that a small packet that would normally fit within a single cell will nevertheless be assigned an entire cluster (i.e., effectively wasting a cell). While this is a design choice, if the number of small packets is low relative to the number of large packets, the savings may outweigh the disadvantages. In some embodiments, clusters may not be used.

Upon receiving packet data corresponding to a new packet, input block 400 may be configured to allocate clusters in shared memory 440 (using cluster link memory 404) and a packet descriptor to the new packet. Packet descriptors are entries in packet descriptor memory 408 that contain information about the packet. One example of information contained within a packet descriptor may include pointers to which clusters in shared memory 440 store data corresponding to the packet. Other examples may include format information about the packet (e.g., the packet length, if known), and the destination ports for the packet.

In the embodiment of switch fabric 140 shown in FIG. 1, data transport block 420 includes cell assembly queues 422, cell disassembly queues 424, cut-through crossbar switch 426, and multiplexer 428. Cell assembly queues 422 are configured to receive packets from input block 400 and store them in shared memory 440. In one embodiment, cell assembly queues 422 may operate as FIFO memories combined with a memory controller to control the storage of the packets into shared memory 440. Cut-through crossbar 426 is configured to connect selected inputs and outputs together in cooperation with multiplexer 428. Advantageously, this may allow cut-through routing of packets, as explained in greater detail below.

In some embodiments, switch fabric 140 may be implemented using multiple chips that operate in parallel. In these configurations, cell assembly queue 422 and cell disassembly queue 424 may operate as serial-to-parallel and parallel-to-serial converters, respectively. For example, in an implementation having four switch fabric chips, as a particular 4-byte word is received, input FIFO 402 may be configured to distribute the 4-byte word amongst the four chips (i.e., one byte per chip) with one byte going to each chip's data transport block 420. Once 16 bytes have been received in each chip's cell assembly queue 422, the 64-byte cell may be stored to shared memory 440. Similarly, assuming a 128-bit data interface between shared memory 440 and the four switch fabric chips 140, a 64-byte cell may be read from shared memory 440 in four 16-byte pieces (i.e., one piece per chip), and then converted back into a single serial stream of bytes that may be output one byte per clock cycle by output FIFO 462.

Shared memory 440 may have write ports that are coupled to cell assembly queues 422, and read ports coupled to cell disassembly queues 424. In one embodiment, switch fabric 140 may support multiple ports for input and output, and switch fabric 140 may also be configured to perform bit-slice-like storage across different banks of shared memory 440. In one embodiment, each switch fabric 140 may be configured to access only a portion of shared memory 440. For example, each switch fabric may be configured to access only 2 megabytes of shared memory 440, which may have a total size of 8 megabytes for a 16-port switch. In some embodiments, multiple switch fabrics may be used in combination to implement switches supporting larger numbers of ports. For example, in one embodiment each switch fabric chip may support four full duplex ports. Thus, two switch fabric chips may be used in combination to support an eight-port switch. Other configurations are also possible, e.g., a four-chip configuration supporting a sixteen-port switch.

Output block 460 comprises output FIFO 462, scheduler 464, queue link memory 466, and queue descriptor memory 468. Output FIFO 462 is configured to store data received from shared memory 440 or from cut-through crossbar 426. Output FIFO 462 may be configured to store the data until the data forms an entire packet, at which point scheduler 464 is configured to output the packet. In another embodiment, output FIFO 462 may be configured to store the data until at least a predetermined amount has been received. Once the predetermined threshold amount has been received, then output FIFO 462 may begin forwarding the data despite not yet having received the entire packet. This is possible because the data is being conveyed to output FIFO 462 at a fixed rate. Thus, after a predetermined amount of data has been received, the data may be forwarded without fear of underflow because the remaining data will be received in output FIFO 462 before an underflow can occur. Queue link memory 466 and queue descriptor memory 468 are configured to assist scheduler 464 in reassembling packets in output FIFO 462.

Data that can be cut-through is routed directly through cut-through crossbar logic 426 and multiplexer 428 to the output FIFO 462, and then to the egress packet interface (e.g., a 16-bit output interface). Packets that cannot be cut-through are stored in shared memory 440. These packets are added to one of several output queues. An internal scheduler selects packets from the various queues for transmission to an output port. The packet is read from the SRAM, passed through the output FIFO, and then sent to the egress packet interface. The ingress and egress packet interfaces may include interface logic such as buffers and transceivers, and physical interface devices (e.g., optics modules).

Next, one example of how a packet may be routed in the switch will be described. When a first packet arrives at an input port from the ingress packet interface, it is routed to input FIFO 402 for temporary storage. An entry for the packet is created and stored into packet descriptor memory 408. This new entry is reflected in packet free queue 406, which tracks which of the entries in packet descriptor memory 408 are free. Next, the packet is briefly examined to determine which output port(s) the packet is to be routed to. Note, each packet may be routed to multiple output ports, or to just a single output port. If the packet meets certain criteria for cut-through routing (described in greater detail below), then a cut-through request signal is conveyed to the corresponding output port(s). Each output port that will receive the packet may detect the signal requesting cut-through routing, and each output port makes its own determination as to whether enough resources (e.g., enough storage in output FIFO 462) are available to support cut-through. The criteria for determining whether an output port is available are described in detail below. If the output has the resources, a cut-through grant signal is sent back to the input port to indicate that cut-through is possible. The packet is then routed from input FIFO 402 to the corresponding output port's output FIFO 462 via cut-through crossbar 426.

If one or more of the packet's corresponding output ports are unable to perform cut-through, or if the packet does not meet the requirements for performing cut-through, then the process of writing the packet from input FIFO 402 to shared memory 440 begins. Cell assembly queue 422 effectively performs a serial-to-parallel conversion by dividing the packet into cells and storing the cells into shared memory 440. Information about the clusters allocated to the packet is stored in cluster link memory 404 (i.e., enabling the cells to be read out of shared memory 440 at some future point in time). As noted above, in early forwarding, shared memory 440 operates in a manner somewhat similar to a large FIFO memory. The packet is stored in a linked list of clusters, the order of which is reflected in cluster link memory 404. Independent of the process of writing the packet into shared memory 440, a packet identifier (e.g., a number or tag) is added to one output queue for each corresponding output port that will receive a copy of the packet. Each output port may have a number of output queues. For example, in one embodiment each output port may have 256 output queues. Having a large number of queues allows different priorities to be assigned to queues to implement different types of scheduling such as weighted fair queuing. Adding a packet number to one of these queues is accomplished by updating queue link memory 466 and queue descriptor memory 468. Scheduler 464 is configured to employ some type of weighted fair queuing to select packet numbers from the output queues. As noted above, details of one embodiment of scheduler 464 (also referred to as a scheduling unit) are described in U.S. patent application Ser. No. 09/685,985, titled "System And Method For Scheduling Service For Multiple Queues," by Oberman, et al., filed on Oct. 10, 2000.

Figure 3:
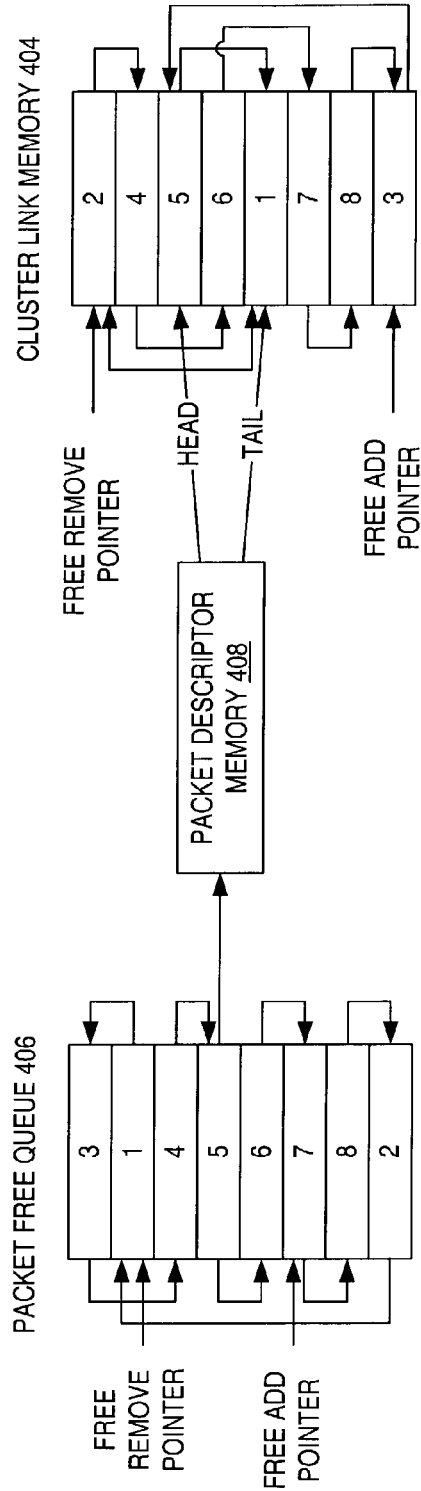
FIG. 3 illustrates details of one embodiment of the cluster link memory, packet free queue, and packet descriptor memory from FIG. 1.
Figure 4:
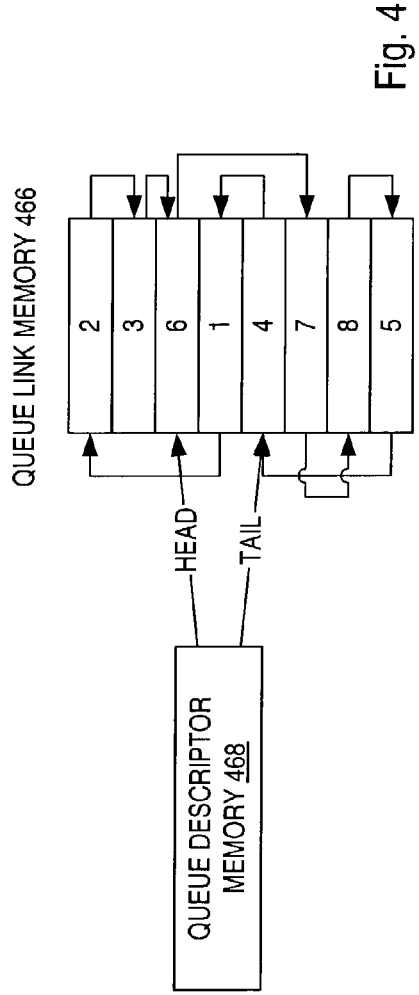
FIG. 4 illustrates details of one embodiment of the queue descriptor memory and queue link memory from FIG. 1.

Once a packet number is selected from one of the output queues, the corresponding packet is read from shared memory 440, reformatted into a serial stream from by cell disassembly queue 424, and routed to the corresponding output FIFO 462. From the output FIFO the packet is eventually output to the network through the egress packet interface. However, unless store and forward routing is used (i.e., a worst case scenario from a latency standpoint), the process of reading the packet from shared memory 440 into output FIFO 462 begins before the entire packet has been stored to shared memory 440. In some cases, the process of transferring the packet from shared memory 440 to output FIFO 462 may begin even before the entire packet has been received in input FIFO 402. How soon the output port can begin reading after the input port has started writing depends on a number of different factors which are described in greater detail below. Block diagrams for the main link memories in the input block 400 and output block 460 are shown in FIGS. 3 and 4. More details of input block 400 and output block 460 are also described below.

Turning now to FIG. 2, details of one embodiment of a packet descriptor 490 are shown. Note, as used herein a "packet descriptor" is different from a "packet identifier" (also called a "packet number"). While a packet descriptor stores information about a packet, a packet identifier is a number that identifies a particular packet that is being routed by the switch. Additional information may optionally be included in the packet identifier depending on the embodiment. As illustrated in the figure, this embodiment of the packet descriptor includes a queue count field 490A, a cluster count field 490B, an input flow number field 490C, a threshold group/virtual channel number field 490D, a cell list head field 490E, a cell list tail field 490F, a tail valid indicator bit 490G, an error detected indicator bit 489H, an indicator bit for packets that are to be dropped when scheduled 490I, a source port field 490J, and a high priority indicator field 490F. However, other configurations for packet descriptors are also possible and contemplated.

FIG. 3 illustrates details of one embodiment of cell link memory 404, packet free queue 406, and packet descriptor memory 408. As shown in the figure, packet free queue 406 comprises a linked list of pointers to free packet descriptors within packet descriptor memory 408. While different configurations are possible and contemplated, each packet descriptor may comprise a start or head pointer and an end or tail pointer to cluster link memory 404. Cluster link memory may comprise pointers to different memory locations within shared memory 440. In some embodiments, two free pointers (i.e., a free add pointer and a free remove pointer) may be used to access available locations within packet free queue 406. This causes packet free queue to act as a queue as opposed to a stack. This configuration may advantageously yield lower probability of soft errors occurring in times of low utilization when compared with a configuration that utilizes packet free queue 406 as a stack.

FIG. 4 illustrates details of one embodiment of queue descriptor memory 468 and queue link memory 466. Queue descriptor memory 468 may be configured to store pointers indicating the start and end of a linked list in queue link memory 466. Each entry in queue link memory 466 is part of a linked list of pointers to packet numbers for representing packets stored in shared memory 440.

Turning now to FIG. 5, a diagram illustrating one embodiment of the structure of input FIFO 402 is shown. Each input port may have its own input FIFO. The input FIFO may be configured to hold four cells 468A-D, wherein each cell contains 16 32-bit words. A separate routing control word (RCW) FIFO 464A-D may be included to hold four data words corresponding to the four RCWs that could be present for the four cells (i.e., assuming each cell contains a unique packet). A separate length FIFO 462A-D may also be included to hold the length of up to four packets that may be present in input FIFO 402. A separate set of 64 flip-flops 470 may be used to hold a 1-bit EOF flag, indicating whether the corresponding input FIFO word is the last word of a packet. A related set of four flip-flops 466A-D, one per cell, may be used to indicate whether an EOF exists anywhere within a cell. Note that the figure merely illustrates one particular embodiment, and that other embodiments are possible and contemplated.

FIG. 6 illustrates one embodiment of a set of pointers that may be used in connection with input FIFO 402 of FIG. 5. Pointers 472A-B point to the head and tail of FIFO 402, respectively. Pointer 474 points to the saved first cell for the currently read packet. Pointer 476 points to the word within the tail cell (as indicated by pointer 472B) that is being written to. Pointer 478 may be used to point to the word within the head cell (as indicated by pointer 472A) that is being read from for store-and-forward routing, while pointer 480 may be used to point to the word within the head cell that is being read from for cut-through routing. As described in greater detail below, cut-through routing forwards a received packet directly to an output port without storing the packet in shared memory 440. In contrast, early forwarding routing places received packets into shared memory 440 until the output port is available (e.g., several clock cycles later).

FIG. 7 illustrates one embodiment of a state machine that may be used to operate input FIFO 402 from FIG. 6. In some embodiments, the state machine of FIG. 7 may be implemented in control logic within input block 400. The input block 400 may include an input FIFO controller to manage both reads and writes from input FIFO 402. The controller may control reading of the input FIFO 402, extracting routing information for a packet, establishing cut-through (if possible), and sending the packet to shared memory 440 if cut-through is not possible or granted. Further, in cases where the length of a packet is written into the header, the controller may save the first cell of the packet in input FIFO 402. After reading and storing the rest of the packet, the controller may return to the saved first cell and write it to shared memory 440 with an updated length field. One potential advantage to this method is that it may reduce the processing required at egress. For example, in the case of a packet going from a Fibre Channel port to a Gigabit Ethernet port (i.e., an IP port), normally the packet would be stored in its entirety in the output FIFO so that the length could be determined and the header could be formatted accordingly. However, by saving the first cell in the input FIFO, the length of the packet may be determined once the packet has been completely written to shared memory. The header (in the first cell) may then be updated accordingly, and the first cell may be stored to shared memory. Advantageously, the packet is then ready to be output without undue processing in output block 460.

In one embodiment, the controller (i.e., state machine) may run at either an effective 104 MHz or 52 MHz, based upon whether it is a 1 Gbps or 2 Gbps port (e.g., with an actual clock frequency of 104 MHz). State transitions may occur every-other cycle in the 1 Gbps case, or every cycle in the 2 Gbps case. These are merely examples, however, and other configurations and operating frequencies are also possible and contemplated.

Figure 8:
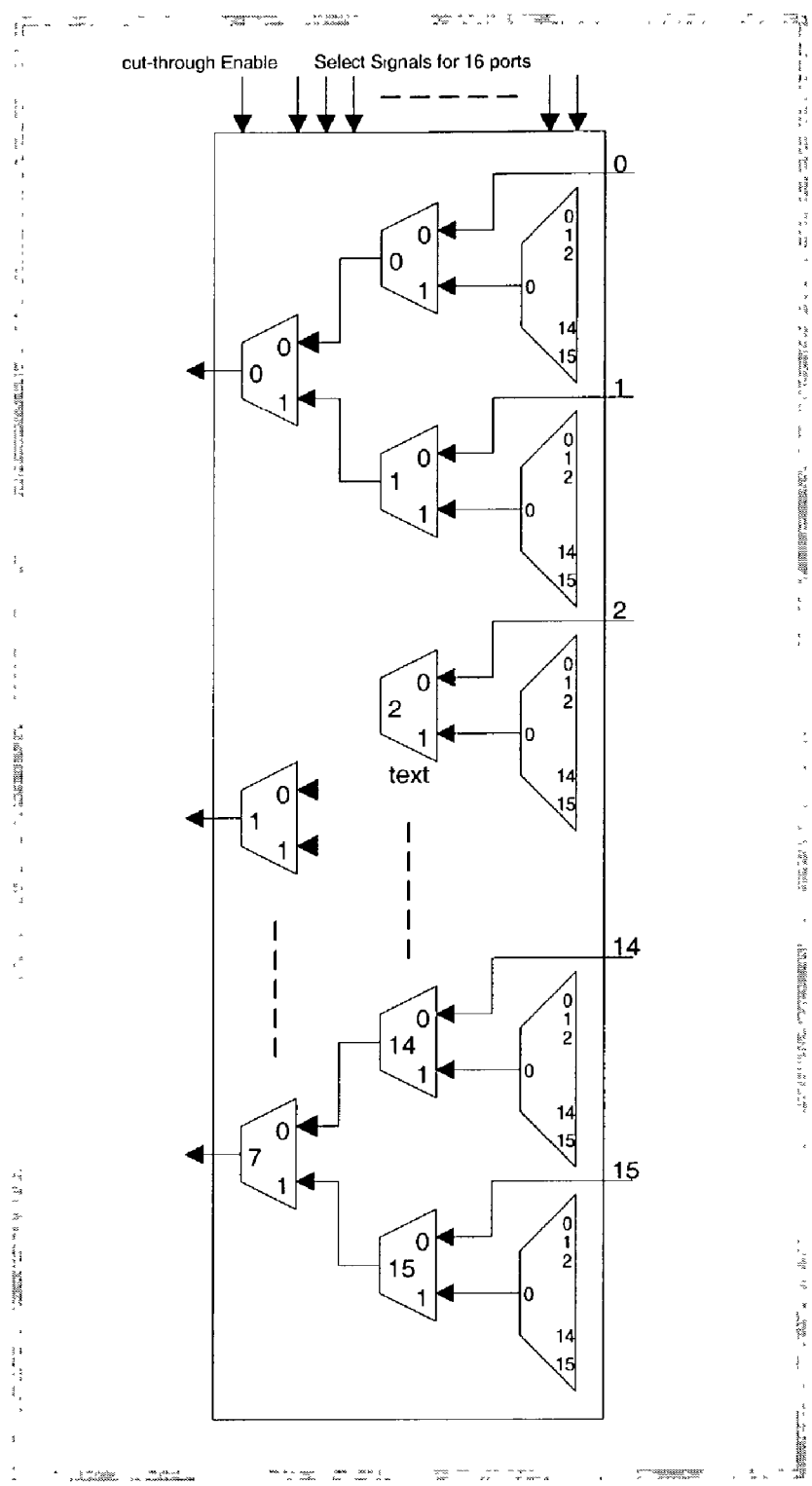
FIG. 8 is a diagram illustrating details of one embodiment of multiplexing logic within the data transport block of FIG. 1.

FIG. 8 is a diagram illustrating details of one embodiment of multiplexing logic 428 within data transport block 420. Multiplexing logic 428 selects the data that should be forwarded to the output port (i.e., via output FIFO 462). If early forwarding/store-and-forward routing is used, then multiplexing logic 428 will select the data coming from shared memory 440's read data port queue. If the data to be forwarded is a cut-through packet, multiplexing logic 428 selects the data from cut-through cross bar 426 and sends it to the output port depending on the select signals generated by the control logic. If cut-through routing is disabled, then the data from the shared memory 440 is forwarded. In one embodiment, multiplexing logic 428 is configured to only select the cut-through data for the ports for which cut-through routing is enabled. For all the other ports, the data from shared memory 440's read queues is forwarded.

The first set of multiplexers 620 select the input port data from which it needs to be cut-through depending on the port select signal generated by the cut-through master. Once the correct port data is selected, the next set of multiplexers 622 selects between the cut-through data or the data from the SRAM read queues. The control logic will clear the cut-through select bit once the cut-through forwarding is complete so that the data from shared memory 440 read queues is forwarded as soon as the cut-through is disabled.

To save pin count, in some embodiments two output ports may share one data bus. In this configuration the data from two adjacent ports is multiplexed and sent to the output block. For example, in 1 Gb mode, port N uses the first 104 MHz clock and port N+1 uses the second 104 MHz clock for the data. This means that the effective data-rate per port in 1 Gb mode is 52 MHz. In 2 Gb mode, each cycle contains data for port N, and thus the effective data-rate is 104 MHz. However, other configurations and operating speed are also possible and contemplated.

Figure 9:
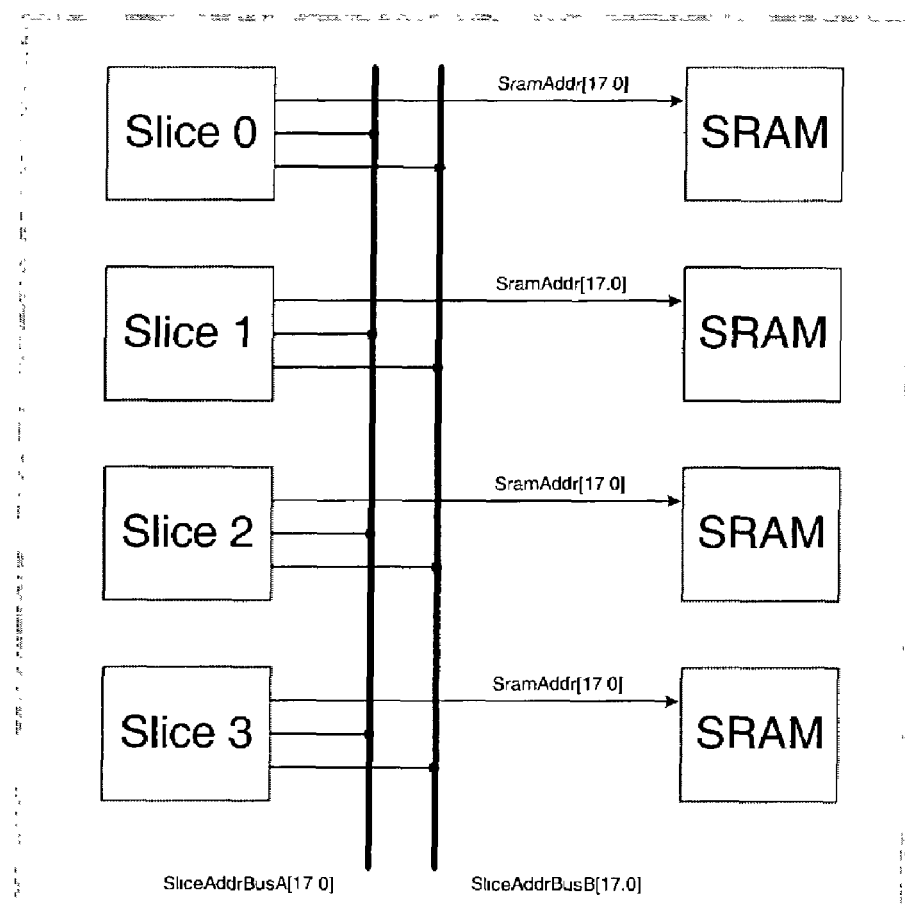
FIG. 9 illustrates details of one type of address bus configuration that may be used with the shared memory (RAM) of FIG. 1.

FIG. 9 illustrates details of one type of address bus configuration that may be used with shared memory 440. As shown in the figure, shared memory 440 may be divided into a plurality of blocks 630A-D, wherein each block corresponds to a slice 632A-D (i.e., one portion of input block 400, data transport block, and output block 460). For example, shared memory 440 may be 8 megabytes of SRAM (static random access memory), with each slice 632A-D accessing its own block 630A-D that is 2 MB of external SRAM. Note that shared memory 440 may be implemented using any type of random access memory (RAM) with suitable speed characteristics.

In this embodiment, the interface between the slices 632A-D and the external SRAM blocks 630A-D is a logical 128-bit data bus operating at 104 MHz, but other bus configurations are possible. However, it is possible for any slice to read from another slice's SRAM block; in a four-slice implementation, the full data interface across four slices is 512-bits, with data distributed across all four external SRAM blocks 630A-D. As a result, any given slice needs to address all four SRAM blocks whenever it needs to do an SRAM read or write access. This leads to a number of different possibilities for how the address buses can be arranged between the slices and shared memory 440. Some of these options include using some form of shared global address bus that is time division multiplexed (TDM) between the 16 ports.

In one embodiment, all slices share a single global TDM address bus connected to all SRAM blocks. However, it may be difficult to drive this bus at higher frequencies (e.g., 104 MHz) because the bus would have to span the entire motherboard and have multiple drops on it. In another embodiment, two 52 MHz TDM global address buses are used. Ports 0 and 2 on the slice drive address bus A on positive edges of the 52 MHz clock, and ports 1 and 3 drive address bus B on negative edges of the 52 MHz clock. An external multiplexer may then be used in front of each SRAM block (e.g., selected by a 52 MHz clock and with the two global buses as inputs). The output of the multiplexer is fed to a flip-flop clocked by the 104 MHz clock. With this timing, there are two 104 MHz cycles for the inter-slice address buses to travel and meet the setup timing to the 104 MHz flip-flop. There is one 104 MHz cycle for the output address bus from the multiplexer to meet the setup timing to the SRAM pins. Other configurations and timings are possible and contemplated.

Figure 10:
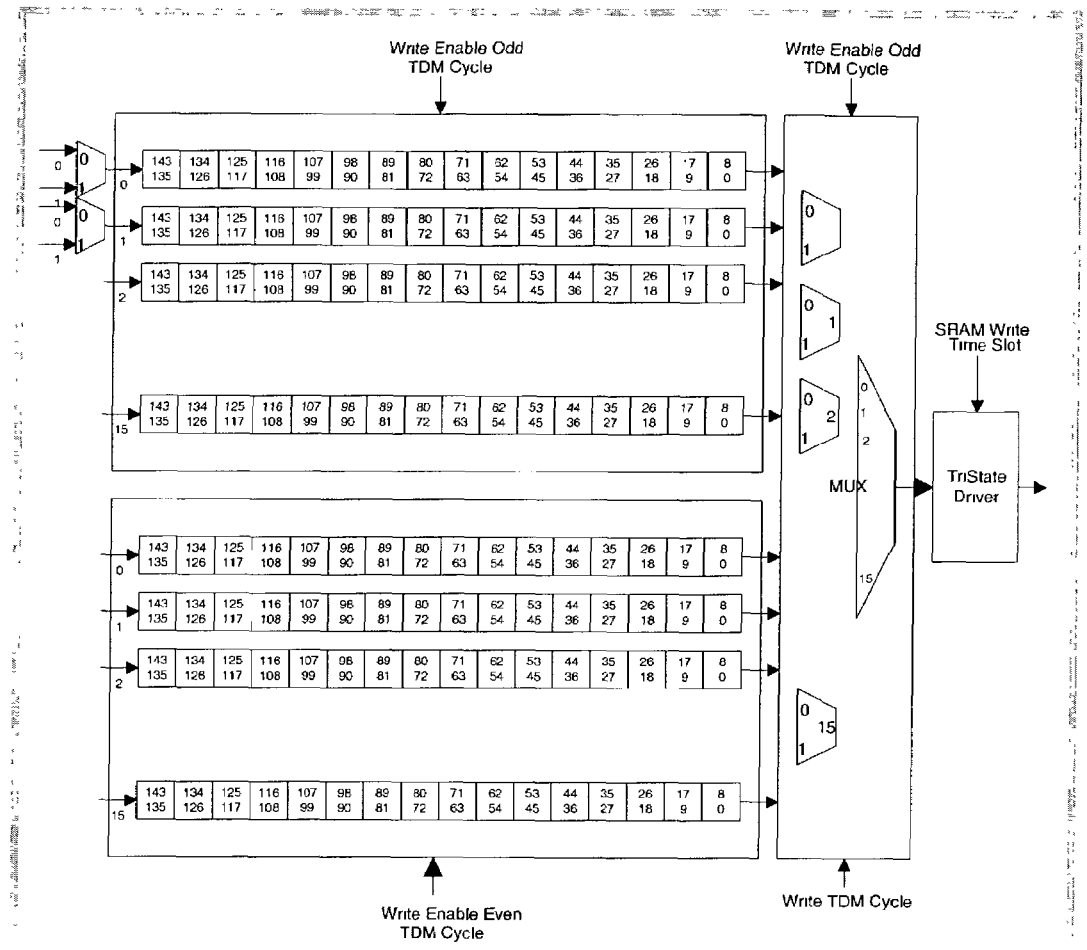
FIG. 10 illustrates one embodiment of a cell assembly queue within the data transport block of FIG. 1.

For example, in yet another embodiment, the multiplexer and flip-flop are integrated into data transport block 420 and switch fabric 140. This configuration may use two extra sets of 18-bit address pins on the switch fabric 140 chip to support bringing the two effective 52 MHz shared buses into and out of the chip. A port drives the shared address bus in the TDM slot of the output port that requested the data. In all other slots, it receives the addresses that are sent on the buses and repeats them onto the local SRAM bus. This embodiment is illustrated in FIG. 10. Note that in this embodiment the buses may be clocked at a higher frequency (e.g., 104 MHz), while the data rate (e.g., 52 MHz) is achieved by driving the addresses on the buses for two consecutive cycles.

FIG. 10 illustrates one embodiment of cell assembly queue 422 within data transport block 420. As shown in the figure, assembly queue 422 receives 8 data transport buses coming into the slice and writes the lower 9-bits of the data into the respective SRAM write queue 640. One motivation behind performing cell assembly is to increase bandwidth for embodiments that have wide ports to shared memory 440. However, if cells are used it may be desirable to configure the system to have greater memory bandwidth than the total port bandwidth in order to achieve desirable performance levels. For example, when a packet is received, additional information (e.g., overhead including routing control information and IP header information for Fibre Channel packets) is added to it. A worst-case scenario may occur when the packet is less than 64 bytes long, but the overhead added to the packet causes it to be greater than 64 bytes long (e.g., 66 bytes long). In this situation, a second cell is used for the final 2 bytes of the packet. Thus, to ensure that the switch is not unduly limiting the performance of the network, a 2× speed up in total memory bandwidth compared with total line bandwidth may be desirable.

In one embodiment, it takes a complete TDM cycle to accumulate 144-bits for a single 1 Gbs port (128 bits of data and 16 control bits). After accumulating 144-bits of data, the data is written to shared memory 440 in the port's assigned write timeslot in the next TDM cycle. The data will be written into shared memory 440 in a timeslot within the same TDM cycle. Thus, while writing the accumulated data to shared memory 440 for a particular port, there may be additional input data coming from the port that continues to be accumulated. This is achieved by double buffering the write queues 640. Thus, data from the input ports is written to one side of the queue and the data to be written to shared memory 640 is read from the other side of the queue. Each port's 144-bits of accumulated write data is written to the shared memory in the port's assigned write timeslots. In this embodiment, every port is capable of writing a complete cell in a single TDM cycle.

In 2 Gb mode, 144-bits for a port are accumulated in one-half of a TDM cycle, i.e., in sixteen 104 MHz cycles. Each 2 Gb port has two timeslots, as well as a pair of cell assembly/disassembly queues. Thus, every 16 cycles one of multiplexers 642 in front of the cell assembly queues for ports N and N+1 switches the data from flowing into port N's cell assembly queue to flowing into port N+1's cell assembly queue. In this embodiment, when writing into port N's queue, port N+1's queue is neither write-enabled nor shifted. Similarly, when writing into port N+1's queue, port N's queue is neither write-enabled nor shifted. Each queue remains double-buffered, the same as in the 1 Gb mode. Both queues are written to SRAM, in their assigned timeslots.

Double buffering is achieved by having two separate sets of queues 644A and 644B. At any given time, one set is configured for accumulating the data as it comes from the input block, and the other set is configured to write the accumulated data to shared memory 440. This behavior of the queues 644A-B is changed once every complete TDM cycle. In one embodiment, the queues are implemented as a shift register with 9-bits of data shifting right. In 1 Gb mode, the shifting may occur once every two 104 MHz cycles (once every 52 MHz cycle). In 2 Gb mode, the shifting may occur once every 104 MHz cycles. So after 16 writes, the data in the queue 422 will be as shown in FIG. 10. The queues are followed by two stages of multiplexers 642. The first stage of multiplexers are 2-1 multiplexers which are used to select between the two queues based on which one has accumulated the data and is ready to supply it to shared memory 440. The second stage of multiplexers is used to select a port from among the different ports depending on the port's assigned write timeslot. The final selected 144-bits of data are written to shared memory 440. Tri-state driver 648 is used to tri-state the bus between queue 422 and shared memory 440 when the shared memory 440 is in a read TDM slot.

Figure 11:
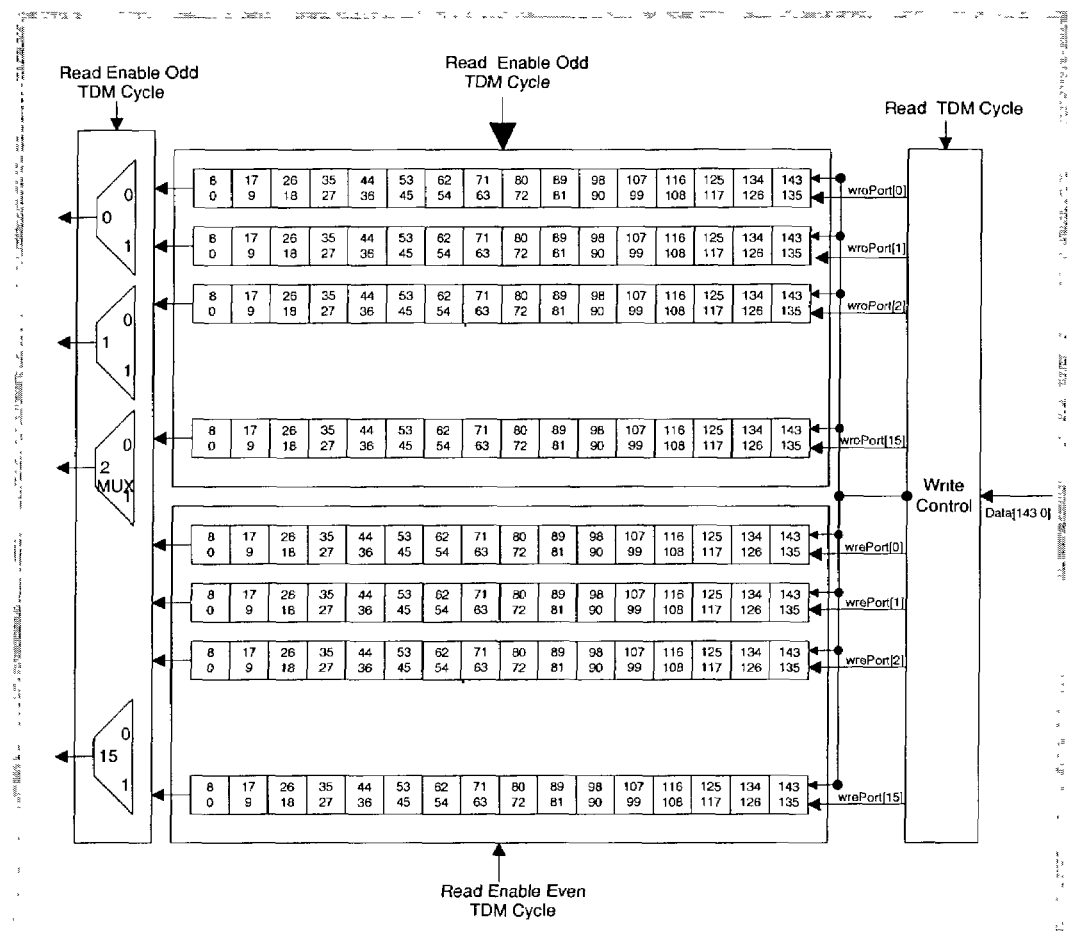
FIG. 11 is a diagram illustrating one embodiment of a cell disassembly queue.

Turning now to FIG. 11, one embodiment of cell disassembly queue 424 is shown. In this embodiment, each port reads 144-bits of data from shared memory 440 in the port's assigned TDM read timeslot. In cut-through forwarding, data transport block 420 is provided with which output ports the packet is being forwarded to, but in the store-and-forward routing mode, data transport block 420 does not have this visibility. Instead, the control logic to read the packet is in input block 400. Input block 400 reads the packet in the output port TDM read timeslot, so the packet is forwarded to the correct output port.

Shared memory 440 write data is written into double-buffered cell disassembly queues 424. Similar to cell assembly queues 422, the data read from shared memory 440 is written to one side of the double-buffered queues while the data sent to the output ports is sent from the other side of the buffer. In one embodiment operating in 1 Gb mode, it may take the entire TDM cycle to read the 16 entries out of the back-buffered cell disassembly queue. In this embodiment, the data is clocked out one word every two 104 MHz cycles from a given queue. Data path multiplexers 665 then switch between the words of adjacent ports to be sent over the inter-slice data path at 104 MHz. In 2 Gb mode, the 16 entries may be read out in one-half of a TDM cycle from the double-buffered cell disassembly queue 424. In this case, data is clocked out one word every 104 MHz cycle. Data path multiplexers 665 then switch between ports N and N+1 every 16 cycles, rather than every cycle, such that contiguous data flows at a data rate of 104 MHz. Note, that the timing given herein is merely for explanatory purposes and is not meant to be limiting. Other operating frequencies are possible and contemplated.

In one embodiment, the data from shared memory 440 is read 144-bits at a time in every read TDM cycle. Based on the read TDM timeslot, the write to the respective port is asserted by the write control logic within queue 424. The write control logic also asserts the corresponding enable signal. In the queues 424, the data order in which the data is sent to the output block is the same order in which the data is received from input block 400. Every cycle, the data sent to output block 460 is from the lower 9-bits of each queue. That means in every other 104 MHz cycle (1 Gb mode), or every 104 MHz cycle (2 Gb mode), the data is shifted to the left so that the next set of data to be sent to output block 460 is in the lower 9-bits of the bus. The output multiplexers 424 select the data from the side of the shared memory that is not writing the data and send the 9-bits to output block 460.

Figure 12:
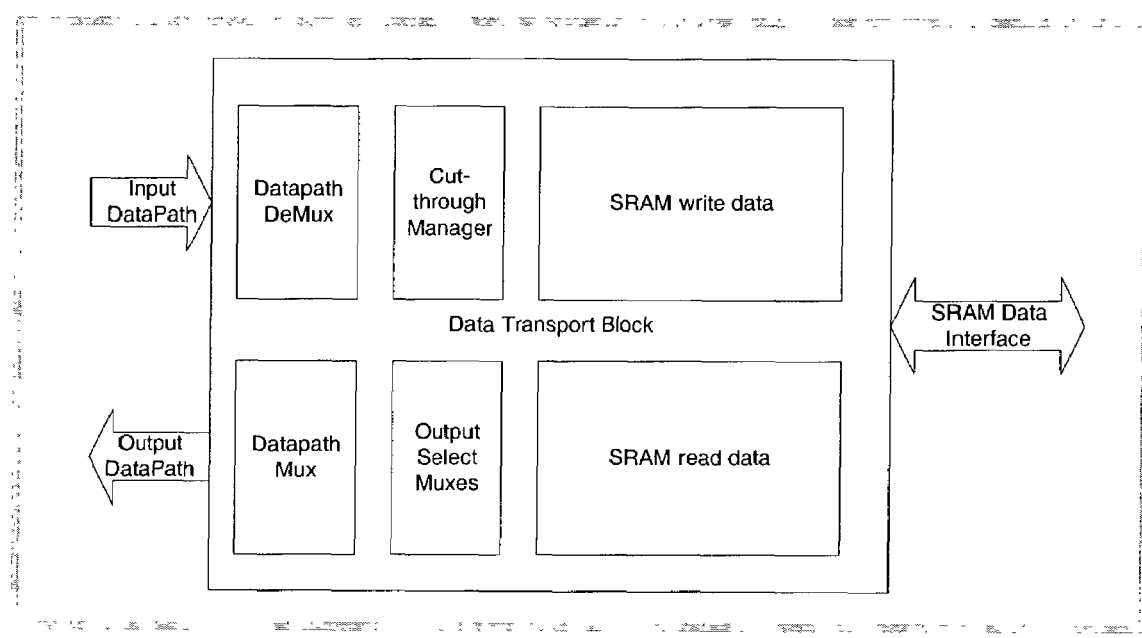
FIG. 12 is a data flow diagram for one embodiment of the data transport block from FIG. 1.

FIG. 12 is a data flow diagram for one embodiment of data transport block 420. Input data path 670 connects data buses (e.g., 10-bits wide) from the input blocks 400 of all slices. The tenth bit communicates a "cut-through" command, while the other nine bits carry data from input blocks 400. The cut-through command may be used to establish a cut-through connection between the input and output blocks. In the case of cut-through, the input data can be sent directly to the output data buses. For early forwarding/store-and-forward routing, the data is sent to the cell-assembly queues 422 and shared memory 440.

In one embodiment, output data path 672 connects to the 9-bit data buses of the output blocks of all slices. These data buses are used to carry data to the output blocks. The output data can be sent directly from the input data buses, in the case of cut-through, or for store-and-forward, be sent from the cell-disassembly queues 424.

In another embodiment, the shared memory data interface 674 may provide a means for storing and retrieving data between the switch fabric 140 and shared memory 440. In this embodiment, the interface is 144-bit wide and includes 128-bits for data and 16 control bits. This results in each 32-bit data word having four control bits. Each data word may have one end of file (EOF) bit and an idle bit. The other two bits may be unused.

In one embodiment, the 144-bit bus is a TDM bus that operates at 104 MHz. In each of the first 16 cycles, 144-bits may be read from shared memory 440 and transferred into one of the cell disassembly queues 424. The 17th cycle is a turnaround cycle when no data is sent or received. Then in each of the second 16 cycles, the 144-bit contents of one of the cell assembly queues 422 are transferred to the SRAM across the bus. The 34th cycle is a turnaround cycle when no data is sent or received. This TDM cycle then repeats.

All of the slices may be synchronized with each other so that they drive the shared memory bus and the inter-slice messaging bus in their respective timeslots. Two signals, SYNC_IN and SYNC_OUT are used to achieve this synchronization. SYNC_IN of data transport block 420 is connected to the SYNC_OUT of input block 400. SYNC_OUT of data transport block 420 is connected to the SYNC_IN of output block 460. As shown in the figure, cut-through manager 676 controls the cut-through select signals sent to the output select multiplexers. Output select multiplexers 678 are the final set of multiplexers to select the correct data to be forwarded to output block 460.

In one embodiment, synchronizing the fabric slices allows all of the slices to be aware of or "know" the current timeslot. In one embodiment, the synchronization of the fabric slices may be performed in the following manner. Each fabric slice may have SYNC_IN and SYNC_OUT pins. Each fabric slice will assert SYNC_OUT during time slice 0. Each fabric slice will synchronize its time slice counter to the SYNC_IN signal, which is asserted during time slice 0. Fabric Slice 0 will have its SYNC_IN signal connected to GND (deasserted). SYNC_OUT may be wired from one slice to SYNC_IN of the neighboring fabric slice. The effect is that all fabric slices generate SYNC_IN and SYNC_OUT simultaneously. For example, if the shared memory has 34 timeslots, the timeslot counter may be a mod-34 counter that counts from 0 to 33. When SYNC_IN is asserted, the counter is loaded with 1 on the next clock cycle. When the counter is 33, SYNC_OUT is asserted on the next clock cycle. In one embodiment, an interrupt may be generated to the CPU if a slice loses synchronization.

Managing Time Division Multiplexed (TMD) Timeslots

A network switch may work under several constraints. Embodiments of the network switch may be designed and implemented to simultaneously manage these constraints. These constraints may include, but are not limited to:

Managing the fastest packet rate for both Gigabit Ethernet and Fibre Channel (1 Gbps and 2 Gbps). This includes handling worst-case scenarios for both Ethernet and Fibre Channel ports.

Support for configurations with different numbers of chips and/or ports (e.g. 4-chip, 16 port and 2-chip, 8 port configurations).

Support for both 1 Gbps and 2 Gbps Fibre Channel ports.

A network switch may include a plurality of ports including one or more input ports, one or more output ports, and/or one or more input/output ports. The network switch may be dynamically reprogrammable to support one of a plurality of timeslot assignments for one or more of a plurality of port configurations. A port configuration may include a subset of the plurality of ports of the network switch. The subset may include a portion or all of the plurality of ports of the network switch. In one embodiment, two or more ports of the plurality of ports of the network switch may be combined to form one port in a port configuration.

The network switch may also include scheduler logic for making scheduling decisions for ports in the port configurations (see scheduler 464 of FIG. 1). The scheduler logic may be coupled to the plurality of ports and the memory, and may be configured to schedule the receiving of input data and the conveying of output data through the plurality of ports using the TDM cycle of the network switch.

In one embodiment, the network switch may include one or more programmable configuration registers that may be used to dynamically reconfigure a network switch to support one or more types of ports (e.g. Gigabit Ethernet, 1 Gbps Fibre Channel, 2 Gbps Fibre Channel, etc.) or combinations of types of ports.

There are a number of resources within the network switch that may be shared both by the ports implemented by a fabric slice and other ports implemented by other fabric slices that collectively make up the network switch fabric. Embodiments of a network switch may use a Time Division Multiplexing (TDM) scheme to efficiently, effectively and consistently utilize these resources. Each port may be assigned at least one TDM timeslot in a TDM cycle to access each of the shared critical resources within the network switch. The management and configuration of the TDM timeslots may be changed for different configurations of the network switch to enable the above listed constraints to be met. In one embodiment, TDM timeslot configuration changes may be dynamically performed by modifying the contents of one or more of the configuration registers.

The network switch may use a shared memory design with a TDM memory that is divided into cells. A cell is the minimum number of bytes that can be read from or written to shared memory. In one embodiment, the width of the shared memory is 512 bits (64 bytes) for a four-chip, 16-port configuration, and a cell is thus 512 bits. The shared memory may be divided into blocks, with one block corresponding to each chip (fabric slice), and with each chip having a 128-bit interface to its corresponding block of SRAM. In one embodiment, the shared memory design distributes data received from a port across each fabric slice or chip using a TDM scheme. For example, of each 64 bytes (512 bits) of data received on a port, each chip (assuming four chips) will write 128 of the bits. The same is true when data for a port is read from shared memory. Each chip reads 128 bits then forwards the data to the port performing the read. The chip performing the memory access (read or write) provides the address to an address bus which provides the same address to all SRAM devices that comprise the shared memory.

One embodiment may include a two-chip, 8-port configuration, with each chip having a 128-bit interface to its corresponding block of SRAM. Thus, the width of the shared memory is 256 bits (32 bytes) for a two-chip, 8-port configuration. In one embodiment, to maintain a consistent cell size across the various configurations, the 512-bit cell size is maintained for the 8-port configuration. Thus, in the 8-port configuration, it takes two write cycles to write a 512-bit cell to shared memory, and two read cycles to read a 512-bit cell to shared memory.

Figure 13:
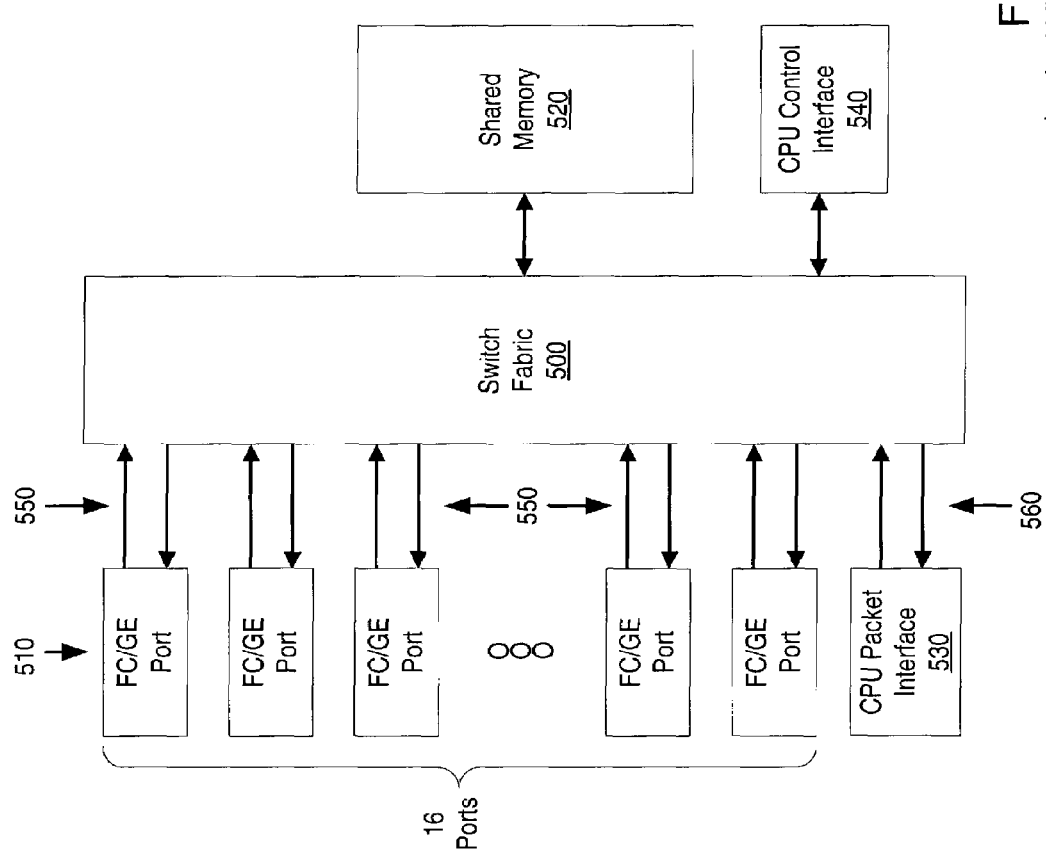
FIG. 13 shows a logical view of a 16-port switch fabric and the resulting interfaces according to one embodiment.

FIG. 13 shows a logical view of a 16-port network switch with switch fabric 500, shared memory 520, ports 510, and the resulting port interfaces 550 according to one embodiment. In this embodiment, the port interfaces 550 may be referred to as GGI (Generic Gigabit Interface) which each may use 36 pins in each direction, plus one signal from the switch fabric 500 indicating when a packet owned by the port 510 has been freed, for a total of 73 signals required per port.

A discussion of how the timing of accesses into the shared memory affects system performance follows. As previously discussed, the packet memory is a time division multiplexed (TDM) shared memory 520. TDM accesses into the shared memory 520, referred to as timeslots, are allocated equally to each port 510. In one embodiment, each port has equivalent bandwidth requirements. In addition, the timeslots may be designated as either read timeslots or write timeslots. In one embodiment, if a port 510 has no activity during its timeslot, the timeslot cannot be used by another port. In one embodiment, if a port 510 has write operations but no read operations, the write operations cannot be done during the read timeslots. These restrictions simplify the shared memory interface logic considerably. One reason for restricting timeslots to a particular port 510 is that it provides the fabric 500 with enough bandwidth to support full line-rate switching on all ports. Therefore, allowing a port 510 to use another timeslot may not provide any benefit (other than a small gain in latency) but may have a significant impact on the logic complexity.

Figure 14:
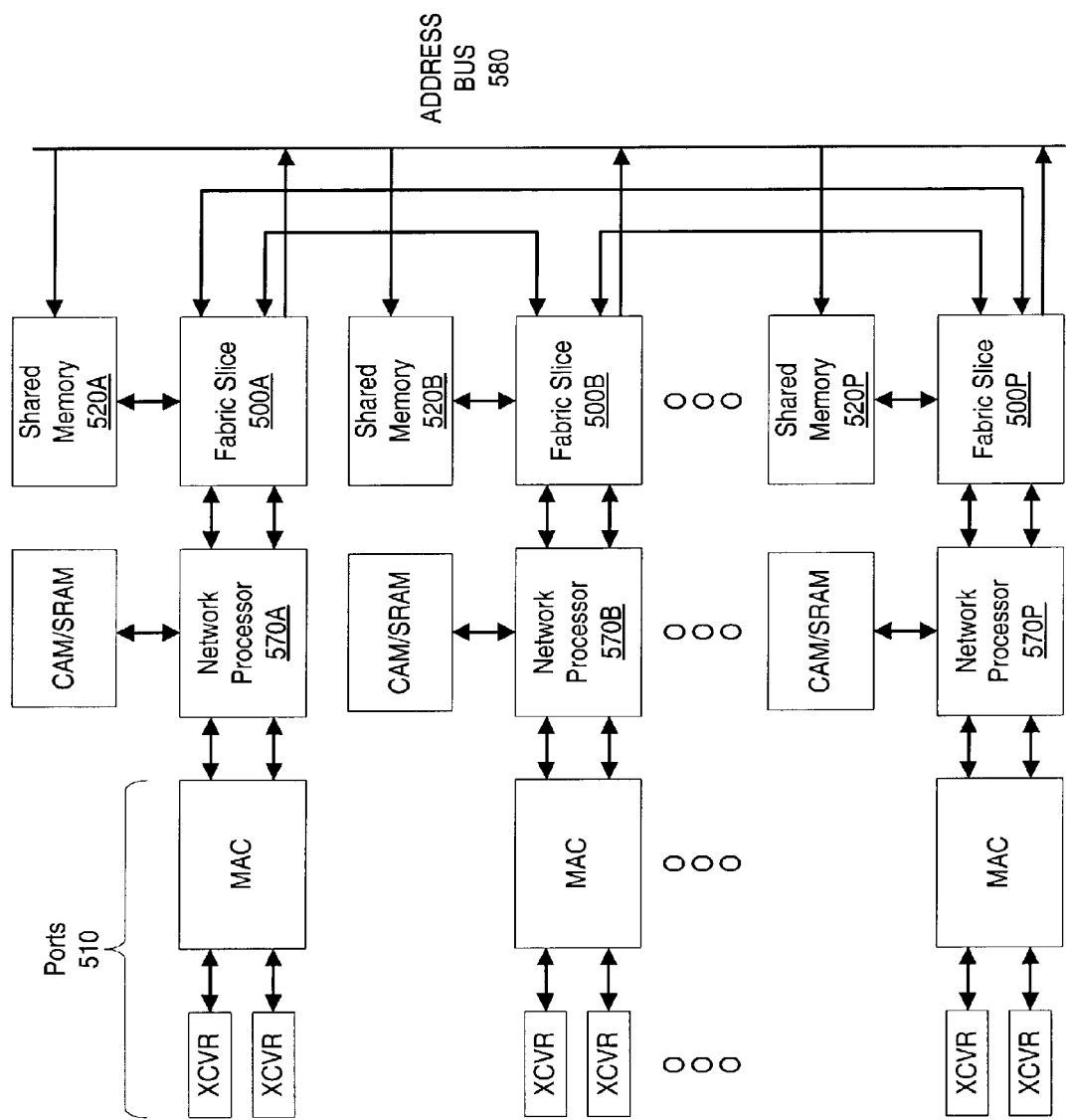
FIG. 14 shows a block diagram of a network switch with shared memory architecture according to one embodiment.

FIG. 14 shows a block diagram of a network switch with shared memory architecture according to one embodiment. In this embodiment, the shared memory design is divided across several devices rather than having a single chip which interfaces to 16 ports as well as a wide memory (e.g. 512 bits). The network switch as illustrated in FIG. 14 may include a switch fabric based on a shared memory that interfaces with a network processor 570 (such as MMC Network Inc.'s XPIF-300 or GPIF-207).

In some embodiments, the clock frequency of the shared memory 520 may be based on the clock frequency of the network processor 570. For example, in one embodiment that uses MMC Network Inc.'s GPIF-207, the clock frequency of the shared memory 520 may be 104 MHz. This value is derived from the fact that the GPIF-207 operates at 52 MHz and thus the GGI interface operates at 52 MHz. Doubling the clock frequency to maintain synchronization yields 104 MHz. Other embodiments may use other clock frequencies. For example, if a different network processor is used with a different base clock frequency, the clock frequency of the shared memory 520 may be different. In some embodiments, higher clock frequencies (e.g. 156 MHz) may be used which may allow the word width to be decreased and also may allow less memory to be used.

Figure 15:
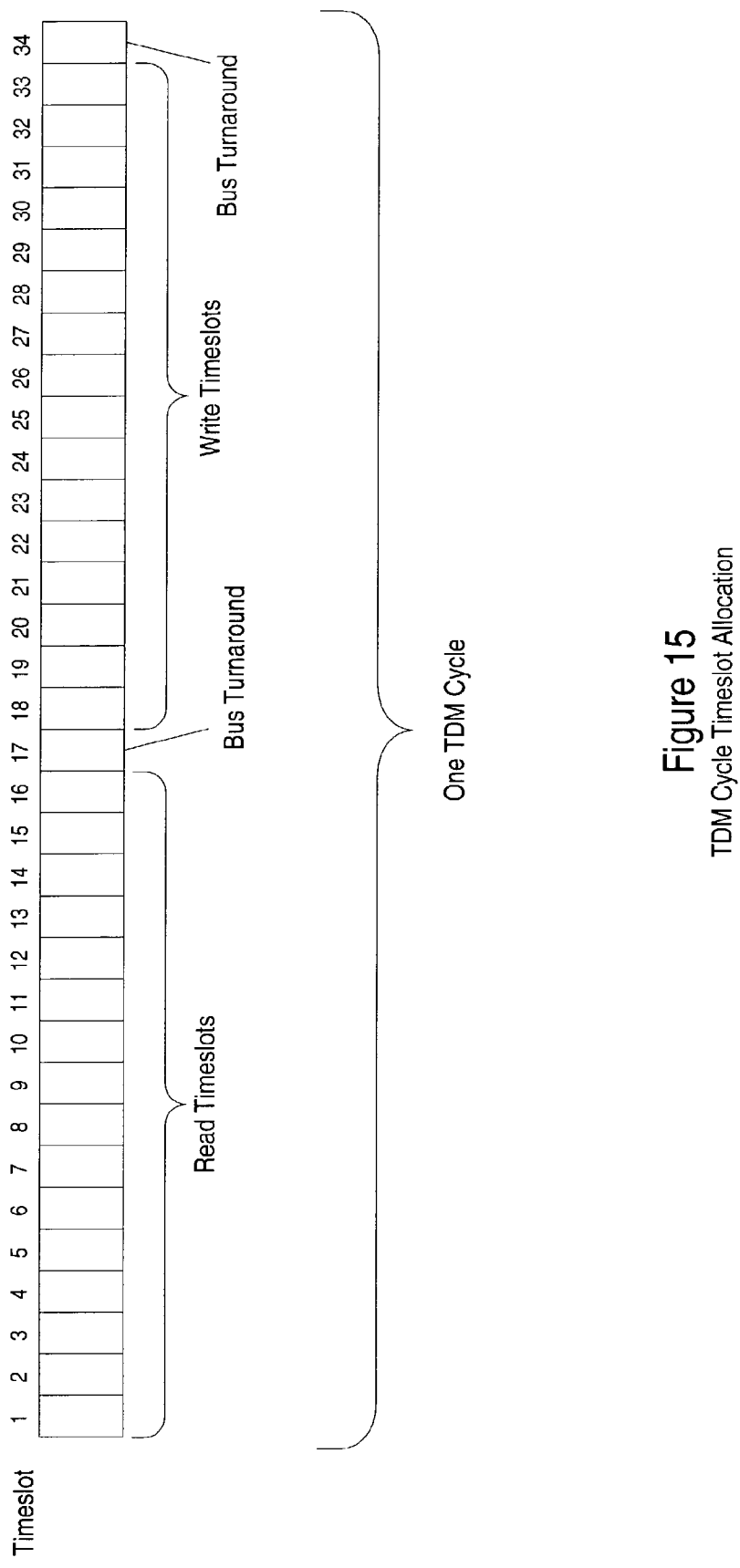
FIG. 15 illustrates a Time Division Multiplexing (TDM) cycle for a network switch according to one embodiment.

FIG. 15 illustrates one embodiment of a TDM cycle for a network switch, where the TDM cycle comprises 34 timeslots with 16 read, 16 write, and 2 bus turnaround timeslots for transitioning between read and write operations. Each timeslot represents one clock cycle. In a 16-port configuration, one cell may be read or written during each timeslot excluding the two bus turnaround slots. Thus, in embodiments where the clock frequency of the shared memory 520 is 104 MHz, the cell rate per port is approximately 3.059 Mcells/sec (104 M divided by 34).

Some embodiments of a network switch may support configurations with varying numbers of fabric slices or chips and/or ports. In one embodiment, the network switch may support 8- and 16-port configurations. The 8-port configuration may use only half as many fabric slices as the 16-port configuration, and requires that the interconnections between the slices be done differently than in the 16-port configuration. For example, in an embodiment with four ports per slice, an 8-port configuration would have two slices and a 16-port configuration four slices. The memory width in the 8-port configuration is halved when compared to the 16-port configuration (e.g. 32 bytes (256 bits) wide instead of 64 bytes (512 bits)). To maintain consistency and simplify the design of the fabric hardware, the 512-bit cell size may be used in the 8-port configuration. Because of the reduction in width of the shared memory in the 8-port configuration, two reads or writes may be required to read/write a 512-bit cell. Therefore, each memory read or write may read/write half of a cell, referred to as a subcell. In other words, since there is half as much SRAM (256 bits instead of 512 bits), twice as much time (2 timeslots instead of 1 timeslot) is used per port in 8-port mode as is used in 16-port mode to maintain the required packet rate in 8-port mode. This includes handling of a worst-case scenario, for example, when a packet is less than 64 bytes long, but the overhead added to the packet causes it to be greater than 64 bytes long (e.g., 65 or 66 bytes long).

In one embodiment, the timeslot assignments may be configured to support both the 8-and 16-port configurations. FIGS. 16 and 17 show assignment of timeslots in a TDM cycle for the two configurations according to one embodiment. In the 16-port configuration as illustrated in FIG. 16, a port writes or reads data in a single clock cycle. In the 16-port configuration, the timeslots for the first half of the 16 ports may be interleaved with the timeslots for the second half of the 16 ports for both the read and the write timeslots as illustrated in FIG. 16. For the 8-port configuration, the data for each port may be read/written in two consecutive clock cycles as illustrated in FIG. 17, with one subcell read/written per cycle.

The timeslot assignments as illustrated in FIGS. 16 and 17 may advantageously require a minimum amount of change between the two configurations. Viewing the timeslot assignments of FIGS. 16 and 17, note that half of the timeslots (e.g. every other read and every other write timeslot) are assigned to the same port in the two timeslot assignments, thus requiring significantly less configuration change than other timeslot assignments, for example, if the ports of the 16-port configuration were assigned timeslots consecutively (e.g. if ports [0, 1, 2, 3 . . . 15] were assigned read timeslots [1, 2, 3, 4 . . . 16] and write timeslots [18, 19, 20, 21 . . . 33] respectively).

In one embodiment, the interconnect signals used for ports 8 to 15 in 16-port mode can be used for ports 0 to 7 in 8-port mode with little change in the timing. In one embodiment, the timing for ports 8 to 15 (in connecting to the cut through crossbar) may be made identical to that for ports 0 to 7.

In the 8-port configuration, the shared memory address is supplied for two consecutive clock cycles for each timeslot. Because the second clock cycle is for the second half of a cell, the address will be the same but with the lower address bit a 1 as opposed to a 0 in the first clock cycle.

Figure 18A:
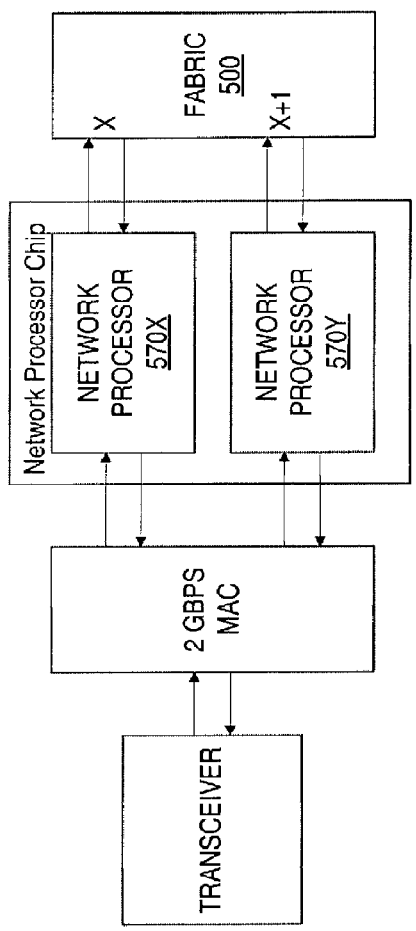
FIG. 18A is a block diagram of a network switch architecture that supports double speed (2 Gbps) Fibre Channel according to one embodiment.
Figure 18B:
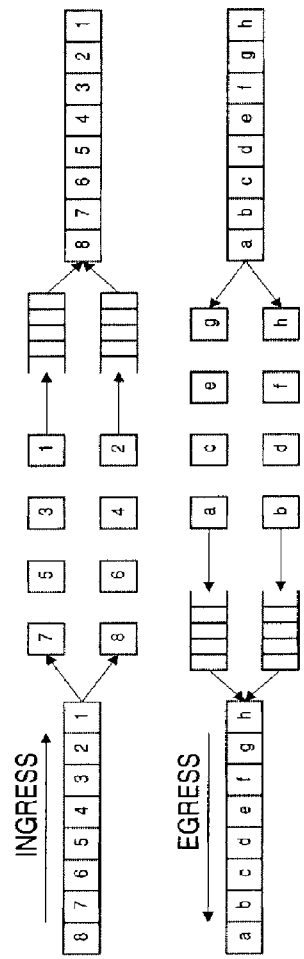
FIG. 18b illustrates processing of ingress and egress packets in a double speed port of a network switch according to one embodiment.

Some embodiments of a network switch may support double-speed, 2 Gbps (Gigabit per second) Fibre Channel (FC) ports. Two or more ports may be combined to form a 2 Gbps FC port. In one embodiment of a network switch as illustrated in FIGS. 18A and 18B, two 1 Gbps FC ports may be combined to form a 2 Gbps FC port, allowing use of both port's timeslots to service the combined port. In one embodiment, the network switch may support sending and completing a new one-cell packet in each timeslot, and thus two packets in each complete TDM cycle. Thus, a 2 Gbps port may receive twice as many cells per TDM cycle as a 1 GBps port. Thus, for example, in embodiments where the clock frequency of the shared memory 520 is 104 MHz, the cell rate for a 2 Gbps port is approximately 6.12 Mcells/sec ((104 M/34)*2).

Some embodiments may support configurations with a combination of 1 Gbps FC and 2 Gbps FC ports enabled simultaneously. For example, in a switch with 16 1 Gbps FC ports, the ports are numbered 0-15, some ports may be ganged to form double speed ports and some not ganged to remain as 1 Gbps ports. As an example, ports (0/1, 2/3, 4/5, 6/7) may be ganged to form four double speed ports, and ports 8-15 may remain as 1 Gbps ports, resulting in 12 configured ports. All other possible combinations of 2 Gbps and 1 Gbps FC ports are contemplated.

In one embodiment, a 2 Gbps FC port may use two ports, X and X+1, where X is an even numbered port. For example, ports 0 and 1 may be ganged to form a single 2 Gbps port. In one embodiment with 16 1 Gbps FC ports, ports are numbered 0 to 15, and there are eight possible combinations of ports to form double speed ports (0/1, 2/3, 4/5, 6/7, 8/9, 10/11, 12/13, and 14/15). Thus, a double speed port is the aggregation of two adjacent ports and will have twice the memory bandwidth and twice as many shared memory timeslots, but the switch will only support half as many ports. In one embodiment, to schedule the packet transmission, the scheduler may operate twice as fast for a 2 Gbps FC port than for a 1 Gbps FC port.

To support a 2 Gbps FC port, the network processor must operate fast enough to handle the processing of packets at the higher bandwidth. In one embodiment using a network processor chip with two network processors such as the MMC GPIF 207, both network processors within the chip may be used to support a 2 Gbps FC port as shown in FIG. 18A. In one embodiment, both network processors may be used for ingress packets and egress packets. The packets may be distributed between the two processors and then reassembled by the fabric slice for ingress packets or by the MAC for egress packets as shown in FIG. 18B. Packet ordering must be maintained when recombining the two packet streams. In one embodiment, packet ordering may be maintained by inserting a packet count at the front of the packet. The packet with the lowest count (when rollover is accounted for) is forwarded first.

FIGS. 19A and 19B illustrate two possible assignments of timeslots in a TDM cycle for a network switch configured to support 2 Gbps FC ports according to one embodiment. In this embodiment, sixteen 1 Gbps FC ports have been combined to form eight 2 Gbps FC ports (Port 0 has been combined with port 1, port 2 with port 3, etc.) FIG. 19A shows a TDM cycle in which the adjacent, ganged FC ports are assigned timeslots spaced two cycles apart, where a cycle is the length of a timeslot. For example, port 0 is assigned the first timeslot, port 1 receives the third timeslot, port 2 receives the fifth timeslot, etc. The embodiment of FIG. 19A allows only two cycles between combined ports (e.g. ports 0 and 1) for packet scheduling decisions affecting the one 2 Gbps FC port formed by the combination of the two 1 Gbps FC ports. This constraint may put unreasonable timing pressures on the scheduler.

To allow the scheduler more time in making scheduling decisions for combined ports, one embodiment of a network switch may use a TDM cycle as illustrated in FIG. 19B. In FIG. 19B, there are at least 16 cycles between the assigned timeslots of the combined ports (e.g. ports 0 and 1) as port 0 is assigned timeslot 0 and port 1 timeslot 17, port 2 is assigned timeslot 3 and port 3 is assigned timeslot 19, etc. Note that between ports 1 and 0, there are 18 cycles, as the two "extra" timeslots normally used as turnaround timeslots have been moved to the end of the TDM cycle. Alternatively, one or both of the turnaround timeslots may be placed elsewhere in the TDM cycle, for example, after timeslot 16 (moving port 1's assigned timeslot up one or two). The configuration shown in FIG. 19B, however, may be less complex to implement than a configuration with the "extra" turnaround timeslots elsewhere in the TDM cycle.

FIG. 20 is a table illustrating one embodiment of a TDM timeslot distribution scheme for the critical resources shared by an input block 400 for a fully configured 16-port switch. Each timeslot represents a single 104 MHz clock cycle. The first column of the table represents the 34 timeslots numbered from 0 to 33.

The second column represents the SRAM (shared packet memory) read and writes. The numbers in the column identify the ports. As an example TDM slot 2 is used by port 1 to do a SRAM read, and TDM slot 19 is used by port 1 to do a SRAM write. In column two, the first 16 timeslots are SRAM reads, followed by a single turn-around cycle (TAR). This is then followed by 16 write timeslots and again followed by a single turn-around cycle.

The SRAM TDM timeslots are further constrained by the requirements for an 8-port switch. For a 16-port switch, the SRAM timeslots may be ordered arbitrarily within the read or write boundaries (i.e., any of the first 16 TDM timeslots can be used for reads by any of the sixteen ports). An 8-port switch may be designed by only implementing ports 0-7. As this removes half of the SRAM bandwidth, each remaining port may use two SRAM timeslots to read or write all of its data. By alternating timeslots between used and unused ports (e.g. 0, 8), a single cell number can be used and held for both timeslots.

For an 8-port switch, each access provides or returns a 32-byte (256 bit) sub-cell, where two sub-cells form a 64-byte (512 bit) cell. In one embodiment, in the first cycle a LSB of 0 is appended to a 16-bit cell number (14b cluster number+1b slice number+1b cell within the cluster number) to form the 17-bit sub-cell number. In the second cycle, an LSB of 1 is appended to the 16-bit cell number to form the 17-bit sub-cell number. Note that, in one embodiment, for a 16-port switch, a 17-bit cell number is used (14b cluster number+2b slice number+1b cell within the cluster number).

The third column in the table represents the TDM slot in which an input port (the port number given in the column) informs an output port that a packet has been received for the output port and is ready to be added to an output queue. The Packet Received message is sent when a sufficient number of cells have been written to SRAM. In one embodiment, an inter-slice shared bus may be used to send messages such as Packet Received messages between slices. In one embodiment, the inter-slice bus operates at 52 MHz. In the case of a packet that can be early-forwarded (i.e. store length flag is not set), the Packet Received message is sent based upon the value of the maximum cell threshold value. For other packets, the Packet Received message is sent when a cell containing EOF has been written. The Packet Received message therefore is sent after the cluster memory read state, indicating that all 16 words (64 bytes) have been collected and an address has been selected. In one embodiment, the Packet Received message is sent at the earliest two cycles following the cluster memory read cycle. However, since the cluster memory reads are grouped with all 4 slices using the same TDM timeslots for each cycle, the packet received messages may be spaced out relative to the cluster memory read state. To ensure that all Packet Receive messages are sent in the same TDM cycle, the timeslots are organized as even ports using the first sixteen timeslots followed by the odd ports using the remaining timeslots. As will be described in more detail below, the Cluster Link Memory (CLM) 404 is also read or written by all the even ports followed by all the odd ports. This organization of timeslots where all the even ports followed by all the odd ports is advantageous in embodiments supporting 2 Gbps port configuration.

In one embodiment, ports 0-3 may send Packet Received messages four cycles after their cluster link memory reads, ports 4-7 may send Packet Received messages eight cycles after their cluster link memory reads, ports 8-11 may send Packet Received messages 12 cycles after their cluster link memory reads and ports 12-15 send Packet Received messages 16 cycles after their cluster link memory reads.

The fourth column represents the TDM slot in which the output port (the port number given in the column) requests the input port to begin reading the packet for it. The fifth column represents the TDM slot in which the input port (the port number given in the column) informs the output port that it has completed reading the packet for the output port.

In one embodiment, the assignment of Read Packet Begin and Read Packet Done messages may be constrained by the performance requirements for 2 Gbps ports. In one embodiment, a 2 Gbps port is formed by ganging two adjacent ports together, allowing use of the two ganged port's SRAM timeslots for the 2 Gbps port. In one embodiment, a new one-cell packet may be sent and completed in each SRAM timeslot, or two independent packets in each complete TDM cycle. For example, suppose ports 0 and 1 are ganged to form a single 2 Gbps port, and the output block 460 has several one-cell packets ready to be sent. The output block 460 needs to send a Read Packet Begin command (to port 0), receive the Read Packet Done message from the input block 400, send another Read Packet Begin command (to port 1), and receive the next Read Packet Done message, all in the same TDM cycle.

In one embodiment, to ease the implementation timing constraints for these messages, the TDM timeslots are assigned such that neighboring port numbers, which would be ganged in 2 Gbps operation, are maximally spaced for both Read Packet Begin and Read Packet Done message sets. Further, in one embodiment, the Read Packet Done message cycle is the Read Packet Begin cycle skewed by 8 cycles. This allows the input block sufficient time to process the Read Packet Begin command and then, if necessary, to send the Read Packet Done command. Similarly, the skewing of the Read Packet Done cycle allows the output block time to process the Read Packet Done command, schedule another packet, and be ready to send a new Read Packet Begin command.

The sixth column represents the TDM slot in which the Cluster Link Memory (CLM) 404 is read by the input port (port number given in the column) in order to allocate a new cluster. The seventh column represents the TDM slot in which the CLM is written by the input port (port number given in the column) in order to link the allocated new cluster to the previous cluster belonging to the packet.

The CLM 404 is read by the input FIFO when a new cluster needs to be allocated. In one embodiment, the input FIFO reads the value stored at the free pointer location, returns the free pointer location as the allocated cluster, and moves the free pointer to the value that was stored in that location. When allocating subsequent cells of a packet, the allocated cluster may be linked to a previous cluster number. In one embodiment, this involves writing the location of the newly allocated cluster number to the supplied previous cluster number, effectively linking the new cluster.

In one embodiment, the cluster link memory runs at 104 MHz, and so effectively has 34 TDM timeslots for reads or writes. Each slice has 4 input ports, and so may only require 4 read and 4 write timeslots for the cluster link memory. In one embodiment, the write (or link) timeslots are skewed to be exactly 8 cycles after the related read timeslots.

The eighth column represents the TDM slot in which the read manager for an input port (port number given in the column) reads the CLM 404 so as to read cells of a packet or write to the CLM 404 in case of freeing cells of a packet. The read manager on a slice may need to read the CLM 404 when reading out the next cell of a packet. The read manager may need to write the CLM 404 when freeing clusters. In one embodiment, both reading and writing of the CLM 404 may be done up to 16 times per TDM cycle, for 16 output ports. In one embodiment, it may be guaranteed that for any given read manager operating for a specific output port, the read manager will only need to read the CLM 404 OR write the CLM 404, but never both in the same TDM cycle. There are several cases to consider including, but not limited to, the following cases:

Back-to-back one-cell packets. In this case the CLM 404 never needs to be read since the cluster number to be read is stored in the packet descriptor memory as both the head and tail pointer. However, the cluster will need to be freed, which is done in the TDM cycle following the one in which the packet descriptor memory is read. Since a one cell packet just completed (the first one), in the next TDM cycle there will be no cluster link memory read, only a possible packet descriptor memory read (for the second packet). This assures the availability of a write timeslot in the second TDM cycle for the cluster link memory to be updated for the first packet.

Last cluster of a packet with odd number of cells. In this case the CLM 404 is read to find the next cluster number. Whether or not it is the last cell, no writes of the CLM 404 need be performed in the same TDM cycle. If it is the last cell, the CLM 404 will be written in the next TDM cycle to free the clusters, but there will be no read of the CLM 404 in that TDM cycle.

Next cluster of a packet with odd number of cells. In this case the CLM 404 is read to find the next cluster number. Because there are more cells, the CLM 404 is not written in the next TDM cycle. Further, because there are two cells per cluster, the next cell number is formed by inverting the appended LSB of the cluster number, and thus no CLM 404 operation, read or write, is performed in the following TDM cycle.

The ninth and tenth columns represent the TDM slots in which the read manager reads and writes the Packet Descriptor Queue in order to allocate or de-allocate packet descriptors. The packet descriptor queue is read by the input FIFO when a new packet descriptor needs to be allocated. The input FIFO reads the value stored at the free pointer location, returns the free pointer location as the allocated packet descriptor, and moves the free pointer to the value that was stored in that location.

In one embodiment, the packet descriptor queue runs at 104 MHz, and so effectively has 34 timeslots for reads or writes. In one embodiment, each fabric slice has 4 input ports, and so only needs to use 4 read timeslots for the packet descriptor queue. The packet descriptor queue read timeslots may be identical to the cluster link memory read timeslots of the Input FIFO.

In one embodiment, the read manager on a slice needs to be able to write the packet descriptor queue in order to free packet descriptors up to 16 times per TDM cycle for each of the 16 output ports.

The eleventh and twelfth columns represent the TDM slots in which the Packet Descriptor Memory is either read (input port numbers given in the column) or written in order to get or free the actual packet descriptors.

The packet descriptor memory may be written by the input FIFO two cycles after a new packet descriptor and the first cluster are allocated, as the head (and possibly tail) address are needed. This delay may be needed to be able to generate the appropriate messages for the packet descriptor memory with enough setup time. In one embodiment, each fabric slice has 4 input ports, and so needs to only use 4 write timeslots for the packet descriptor memory.

The read manager on a slice may need to read the packet descriptor memory for the first read of a new packet in order to get the head and tail cell pointers. In one embodiment, this requires 16 TDM timeslots for each of the 16 output ports.

The thirteenth and fourteenth columns represent the TDM slots in which the Queue Count memory is written (input port number given in the column) and read (output port number given in the column).

In one embodiment, after the read manager for an output port finishes reading all of the required cells for a packet, it may need to read the queue count memory to get the current number of outstanding queues on which the packet exists. If the value is greater than one, it needs to decrement that value and write the result back into the queue count memory. The write takes place two TDM timeslots after the read in the same TDM cycle.

In one embodiment, for a given slice, 4 write TDM timeslots are needed for the input FIFO, while 16 write timeslots and 16 read timeslots are needed by the read manager. In one embodiment, in order to provide the necessary write bandwidth to the Queue Count memory, the Queue Count memory is built as a dual-ported memory with independent read and write ports. In one embodiment, this provides 34 read and 34 write TDM timeslots for the queue count memory. In one embodiment, only the read manager may read and write to the same address in the queue count memory. In this case, a read manager operating for an output port may be doing its check of the queue count memory at the same time that the previous output port is doing its decrement. In one embodiment, the queue count memory may be required to write-through (bypass) the write to the read in the case where the read address is the same as the write address, as the write is for the previous value and must be passed along to the "younger" read access.

Since the Queue Count memory is dual ported, column fifteen represents the TDM slots in which the second port is used for additional writing of the Queue Count memory. The queue count memory is written by the input FIFO, two cycles after a new packet descriptor is allocated. This delay may be needed to be able to generate the appropriate messages for the packet descriptor memory with enough setup time. Each fabric slice has 4 input ports, and so only needs to use 4 write timeslots for the queue count memory.

FIG. 21 is a table illustrating one embodiment of a TDM timeslot distribution scheme for the critical resources shared by an output block 460 for a fully configured 16-port switch. Each timeslot represents a single 104 MHz clock cycle. In one embodiment, the output block contains three shared resources: Queue Descriptor Memory (QDM, one per port), Queue Link Memory (QLM, one per port), and Time Tag Memory (TTM, one per slice). Table 21 also shows the timeslot in which each port will begin its next scheduling.

In the table of FIG. 21, the timeslot numbers for QDM, QLM, and TTM without an S prefix refer to the ordering of reads and writes into the structures with respect to a given Packet Received command. Each Packet Received command includes a queue number, a port mask, and a packet number, and it invokes three events for the structures of each port, assuming the port mask matches the port number. For example, for a packet coming from input port 1, if an output port receives a Packet Received command in timeslot 19 and the packet's port-mask matches the output port then:

In timeslot 21, the TTM entry indexed by the new packet number is written with the current time-stamp, along with the discard method for the packet (i.e. is it class 2 or class 3). Also, the QDM entry for the target queue number is read to obtain the last tail packet number. The empty bit is read in this cycle for the target queue.

In the next cycle, i.e., timeslot 22:
the QLM location of the last tail packet number is written with the value of the new packet number from the Packet Received command (link).
the QDM entry for the target queue number is written with the new tail packet number from the Packet Received command. If the queue was previously marked empty, the head packet number is also written with this new packet number.
the empty bit for this queue number is cleared In the table of FIG. 21, the timeslot numbers for QDM, QLM, and TTM with an S prefix refer to the ordering of reads and writes into the structures with respect to an output port having scheduled a packet to be read. Thus, these timeslots are effectively with respect to the Read Packet Begin and Read Packet Done commands.

In one embodiment, a port may schedule a new packet to be read in the Schedule Begin timeslot. For example, for output port 1, this would occur in timeslot 13. The chosen queue number is stored in the end of the timeslot. Then, continuing the example, several events may occur including, but not limited to:
One cycle after Schedule Begin (timeslot 14), the QDM is read to find the packet number at the head of the selected queue. The tail packet number is also read. If the head pointer is the same as the tail pointer, the Empty bit is set for the queue at the end of the cycle. In the case where a Packet Received is trying to clear this bit in the same cycle, the Packet Received clearing action overrides the setting action of the Scheduler and the empty bit is not set.
In the following cycle (timeslot 15), the QLM is read to find the next head packet number. The empty bit is read to determine whether in the previous cycle it was set or cleared.
In the following cycle (timeslot 16), the appropriate Read Packet or Discard command is sent,
In the following cycle (timeslot 17), if the Empty bit was not set in step 2, the QDM for the queue is written with the new head packet number from the previous step. The Discard bit for the queue is cleared.

In one embodiment, a 1 Gb port may use only one of the schedules. In one embodiment, a 2 Gb port may use two of the scheduling periods, its own (port N), and that of the unused adjacent port N+1. In the embodiment illustrated in FIG. 21, not all of the scheduling timeslots are used for a given instance of QDM and QLM. For a 1 Gb port, only two QDM (read and write), one QLM (read), and four TTM (read) timeslots are used (port N uses SN slots). For a 2 Gb port, four QDM (two read and two write) and two QLM (reads) timeslots are used (port N uses SN and SN+1 slots), and, as for the 1 Gb port, four TTM (read) timeslots are used.

In one embodiment, each output port, including the CPU port itself, may also discard a packet instead of reading it. A packet may be discarded by sending either a ReadPacketDiscard command to the Input Block, or by sending an AddtoCpuDiscardQueue command to the CPU port. Both commands are sent in the port's Read Packet timeslot. In the case of AddtoCpuDiscardQueue, the command is sent directly to the CPU's output block, in effect acting very much like a Packet Received command. Thus, the CPU's output block can receive 32 new packets in one TDM cycle: 16 from the input ports and 16 from the output ports. Note only class 2 packets are ever discarded to the CPU discard queue, and class 2 packets are never sent multicast. Thus, there will never be more than one instance of the same packet number on the CPU's discard queue.

The method by which an output port would add a packet to the CPU discard queue for a packet that has been picked for discarding is as follows. In this example, the output port of interest is port 1. All of the steps of the previous example are performed. However:
In timeslot 16, the AddtoCpuDiscardQueue is sent to the CPU, instead of a Read Packet Begin command.
The CPU receives the AddtoCpuDiscardQueue command in timeslot 17.
The CPU reads its CPU discard QDM in timeslot 19 to find the current tail packet number, denoted in the table by C1.
Two cycles later, in timeslot 21, the CPU's discard QDM is written with the newly discarded packet number as the new tail. In parallel, the CPU's QLM is written, at the location of the last tail packet number, with the value of the new packet number from the AddtoCpuDiscardQueue command (link).

In summary, a system and method for managing Time Division Multiplexing (TDM) timeslots in a network switch have been disclosed. While the embodiments described herein and illustrated in the figures have been discussed in considerable detail, other embodiments are possible and contemplated. It should be understood that the drawings and detailed description are not intended to limit the invention to the particular forms disclosed, but on the contrary, the intention is to cover all modifications, equivalents, and alternatives falling within the spirit and scope of the present invention as defined by the appended claims.

What is claimed is:

1. A method for managing the assignment of Time Division Multiplexing (TDM) timeslots of a TDM cycle in a network switch comprising a plurality of ports, the method comprising:
programming the network switch to support a first TDM timeslot assignment scheme for a first subset of the plurality of ports in a first port configuration;
reprogramming the network switch to support a second TDM timeslot assignment scheme for a second subset of the plurality of ports in a second port configuration;
wherein, in a current port configuration, a subset of the plurality of ports are configured to receive input data and to convey output data for the network switch;
wherein the network switch is configured to schedule the receiving of the input data and the conveying of the output data through the subset of the plurality of ports in the current port configuration using a currently programmed TDM timeslot assignment scheme associated with the current port configuration; and
wherein, in the current port configuration, the subset of the plurality of ports are each assigned one or more timeslots of the currently programmed TDM timeslot assignment scheme.

2. The method as recited in claim 1, wherein the network switch further comprises one or more programmable registers, the method further comprising:
storing the currently programmed TDM timeslot assignment scheme in the one or more programmable registers;
wherein the network switch is configured to access the currently programmed TDM timeslot assignment scheme from the one or more programmable registers when scheduling data through the subset of the plurality of ports in the current port configuration.

3. The method as recited in claim 1, wherein the first subset of the plurality of ports in the first port configuration comprises N ports, and wherein the second subset of the plurality of ports in the second port configuration comprises 2N ports, where N is a positive integer.

4. The method as recited in claim 3, where N is 8.

5. The method as recited in claim 3, wherein the TDM cycle comprises a first group of consecutive read timeslots and a second group of consecutive write timeslots.

6. The method as recited in claim 5, wherein the TDM cycle further comprises a first turnaround timeslot after the last read timeslot and a second turnaround timeslot after the last write timeslot, wherein the first turnaround timeslot is used for transitioning from read to write operations and the second turnaround timeslot is used for transitioning from write to read operations.

7. The method as recited in claim 5, wherein the first group comprises 2N read timeslots and the second group comprises 2N write timeslots.

8. The method as recited in claim 5, wherein each of the N ports in the first port configuration is assigned two read timeslots and two write timeslots in the TDM cycle.

9. The method as recited in claim 8, wherein the two read timeslots for each of the N ports are adjacent to each other, and wherein the two write timeslots for each of the N ports are adjacent to each other.

10. The method as recited in claim 5, wherein each of the 2N ports in the second port configuration is assigned one read timeslot and one write timeslot in the TDM cycle.

11. The method as recited in claim 10,
wherein the assigned read timeslots for a first group of N consecutive ports of the 2N ports in the second port configuration are interleaved with the assigned read timeslots for a second group of N consecutive ports of the 2N ports in the second port configuration; and
wherein the assigned write timeslots for the first group of N consecutive ports of the 2N ports in the second port configuration are interleaved with the assigned write timeslots for the second group of N consecutive ports of the 2N ports in the second port configuration.

12. The method as recited in claim 5,
wherein each of the N ports in the first port configuration is assigned two read timeslots and two write timeslots in the TDM cycle, wherein the two read timeslots for each of the N ports are adjacent to each other, and wherein the two write timeslots for each of the N ports are adjacent to each other; and
wherein each of the 2N ports in the second port configuration is assigned one read timeslot and one write timeslot in the TDM cycle, wherein the assigned read timeslots for a first group of N consecutive ports of the 2N ports in the second port configuration are interleaved with the assigned read timeslots for a second group of N consecutive ports of the 2N ports in the second port configuration, and wherein the assigned write timeslots for the first group of N consecutive ports of the 2N ports in the second port configuration are interleaved with the assigned write timeslots for the second group of N consecutive ports of the 2N ports in the second port configuration.

13. The method as recited in claim 1, wherein the first subset of the plurality of ports in the first port configuration includes one or more 2-Gigabit Fibre Channel ports formed by combining at least two ports of the plurality of ports in the network switch.

14. The method as recited in claim 13, wherein the network switch comprises M ports, and wherein the TDM cycle comprises 2 M timeslots for reading and writing packets, where M is an integer greater than 1.

15. The method as recited in claim 14, wherein each of the one or more 2-Gigabit Fibre Channel ports is assigned one timeslot in the TDM cycle for each of the ports combined to form the 2 Gigabit Fibre Channel port.

16. The method as recited in claim 14, wherein two adjacent ports are combined to form each 2 Gigabit Fibre Channel port, wherein one timeslot in the TDM cycle is assigned to each 2 Gigabit Fibre Channel port for each of the two adjacent ports combined to form the 2-Gigabit Fibre Channel port, and wherein the two assigned timeslots for each 2-Gigabit Fibre Channel port are at least M timeslots apart in the TDM cycle.

17. The method as recited in claim 1, wherein the first subset of the plurality of ports in the first port configuration includes 1-Gigabit Fibre Channel ports, and wherein the second subset of the plurality of ports in the second port configuration includes 2-Gigabit Fibre Channel ports.

18. The method as recited in claim 1, wherein the first subset of the plurality of ports in the first port configuration includes one or more of Gigabit Ethernet ports, 1-Gigabit Fibre Channel ports, and 2-Gigabit Fibre Channel Ports, and wherein the second subset of the plurality of ports in the second port configuration includes one or more of Gigabit Ethernet ports, 1-Gigabit Fibre Channel ports, and 2-Gigabit Fibre Channel Ports.

19. A network switch comprising:
   a plurality of ports configured to receive input data and to convey output data for the network switch;
   scheduler logic coupled to the plurality of ports, wherein the scheduler logic is configured to schedule the receiving of the input data and the conveying of the output data through the plurality of ports using a Time Division Multiplexing (TDM) cycle comprising a plurality of timeslots;
   wherein the network switch is programmable to implement any of a plurality of TDM timeslot assignment schemes for the TDM cycle, wherein each of the plurality of TDM timeslot assignment schemes supports a different port configuration of the network switch, wherein each port configuration supports a subset of the plurality of ports, wherein each TDM timeslot assignment scheme assigns one or more timeslots to each port that is present in the subset of the plurality of ports that is supported by the particular port configuration; and
   wherein the network switch is reprogrammable from a current TDM timeslot assignment scheme supporting a current port configuration of the network switch to a new TDM timeslot assignment scheme supporting a new port configuration of the network switch.

20. The network switch as recited in claim 19, further comprising one or more programmable registers, wherein the programmable registers are configured to store the current TDM timeslot assignment scheme programmed into the network switch, and wherein the scheduler logic is configured to access the current TDM timeslot assignment scheme from the one or more programmable registers during said scheduling data through the plurality of ports.

21. The network switch as recited in claim 20, further comprising a Time Division Multiplexed (TDM) random access memory configured to store received data for the network switch, wherein the scheduler logic is coupled between the memory and the ports.

22. The network switch as recited in claim 19, wherein the current port configuration supports N ports of the plurality of ports, and wherein the new port configuration supports 2N ports of the plurality of ports, where N is a positive integer.

23. The network switch as recited in claim 22, where N is 8.

24. The network switch as recited in claim 22, wherein the TDM cycle comprises a first group of consecutive read timeslots and a second group of consecutive write timeslots.

25. The network switch as recited in claim 24, wherein the TDM cycle further comprises a first turnaround timeslot after the last read timeslot and a second turnaround timeslot after the last write timeslot, wherein the first turnaround timeslot is used for transitioning from read to write operations and the second turnaround timeslot is used for transitioning from write to read operations.

26. The network switch as recited in claim 24, wherein the first group comprises 2N read timeslots and the second group comprises 2N write timeslots.

27. The network switch as recited in claim 24, wherein each of the N ports in the current port configuration is assigned two read timeslots and two write timeslots in the TDM cycle.

28. The network switch as recited in claim 27, wherein the two read timeslots for each of the N ports in the current port configuration are adjacent to each other, and wherein the two write timeslots for each of the N ports in the current port configuration are adjacent to each other.

29. The network switch as recited in claim 24, wherein each of the 2N ports in the new port configuration is assigned one read timeslot and one write timeslot in the TDM cycle.

30. The network switch as recited in claim 29,
   wherein the assigned read timeslots for a first group of N consecutive ports of the 2N ports in the second port configuration are interleaved with the assigned read timeslots for a second group of N consecutive ports of the 2N ports in the second port configuration; and
   wherein the assigned write timeslots for the first group of N consecutive ports of the 2N ports in the second port configuration are interleaved with the assigned write timeslots for the second group of N consecutive ports of the 2N ports in the second port configuration.

31. The network switch as recited in claim 24,
   wherein each of the N ports in the current port configuration is assigned two read timeslots and two write timeslots in the TDM cycle, wherein the two read timeslots for each of the N ports are adjacent to each other, and wherein the two write timeslots for each of the N ports are adjacent to each other; and
   wherein each of the 2N ports in the new port configuration is assigned one read timeslot and one write timeslot in the TDM cycle, wherein the assigned read timeslots for a first group of N consecutive ports of the 2N ports in the new port configuration are interleaved with the assigned read timeslots for a second group of N consecutive ports of the 2N ports in the new port configuration, and wherein the assigned write timeslots for the first group of N consecutive ports of the 2N ports in the new port configuration are interleaved with the assigned write timeslots for the second group of N consecutive ports of the 2N ports in the new port configuration.

32. The network switch as recited in claim 19, wherein said current port configuration includes one or more 2-Gigabit Fibre Channel ports formed by combining at least two ports of the plurality of ports in the network switch.

33. The network switch as recited in claim 32, wherein the network switch comprises M ports, and wherein the TDM cycle comprises 2M timeslots for reading and writing packets, where M is an integer greater than 1.

34. The network switch as recited in claim 33, wherein each of the one or more 2-Gigabit Fibre Channel ports is assigned one timeslot in the TDM cycle for each of the ports combined to form the 2-Gigabit Fibre Channel port.

35. The network switch as recited in claim 33, wherein two adjacent ports are combined to form each 2-Gigabit Fibre Channel port, wherein one timeslot in the TDM cycle is assigned to each 2-Gigabit Fibre Channel port for each of the two adjacent ports combined to form the 2-Gigabit Fibre Channel port, and wherein the two assigned timeslots for each 2-Gigabit Fibre Channel port are at least M timeslots apart in the TDM cycle.

36. The network switch as recited in claim 19, wherein the current port configuration includes 1-Gigabit Fibre Channel ports, and wherein the new port configuration includes 2-Gigabit Fibre Channel ports.

37. The network switch as recited in claim 19, wherein the current port configuration includes one or more of Gigabit Ethernet ports, 1-Gigabit Fibre Channel ports, and 2-Gigabit Fibre Channel Ports, and wherein the new port configuration includes one or more of Gigabit Ethernet ports, 1-Gigabit Fibre Channel ports, and 2-Gigabit Fibre Channel Ports.

38. A network switch comprising:

a plurality of ports configured to receive input data and to convey output data for the network switch; and scheduler logic coupled to the ports, wherein the scheduler logic is configured to schedule the receiving of input data and the conveying of output data through the plurality of ports using a TDM cycle comprising a plurality of timeslots;

wherein the network switch is programmable to implement a first port configuration supporting N network switch ports and a second port configuration supporting 2N network switch ports, where N is a positive integer;

wherein the TDM cycle comprises a first group of consecutive read timeslots and a second group of consecutive write timeslots, wherein the first group comprises 2N read timeslots and the second group comprises 2N write timeslots;

wherein each of the N ports in the first port configuration is assigned two read timeslots and two write timeslots in the TDM cycle, wherein the two read timeslots for each of the N ports are adjacent to each other, and wherein the two write timeslots for each of the N ports are adjacent to each other;

wherein each of the 2N ports in the second port configuration is assigned one read timeslot and one write timeslot in the TDM cycle;

wherein the assigned read timeslots for a first group of N consecutive ports of the 2N ports in the second port configuration are interleaved with the assigned read timeslots for a second group of N consecutive ports of the 2N ports in the second port configuration; and wherein the assigned write timeslots for the first group of N consecutive ports of the 2N ports in the second port configuration are interleaved with the assigned write timeslots for the second group of N consecutive ports of the 2N ports in the second port configuration.

39. The network switch as recited in claim 38, where N is 8.

40. The network switch as recited in claim 38, wherein said first port configuration includes one or more of Gigabit Ethernet ports, 1-Gigabit Fibre Channel ports, and 2-Gigabit Fibre Channel Ports, and wherein said second port configuration includes one or more of Gigabit Ethernet ports, 1-Gigabit Fibre Channel ports, and 2-Gigabit Fibre Channel Ports.

41. A network switch comprising:

a plurality of ports configured to receive input data and to convey output data for the network switch; and scheduler logic coupled to the ports, wherein the scheduler logic is configured to schedule the receiving of input data and the conveying of output data through the plurality of ports using a TDM cycle comprising a plurality of timeslots;

wherein the network switch comprises M ports, and wherein the TDM cycle comprises 2M timeslots for reading and writing packets, where M is an integer greater than 1;

wherein the network switch is programmable to implement a port configuration including one or more 2-Gigabit Fibre Channel ports, wherein each of the one or more 2-Gigabit Fibre Channel ports is formed by combining two of the M network switch ports;

wherein each 2-Gigabit Fibre Channel port is assigned two timeslot in the TDM cycle, with one timeslot for each of the two network switch ports combined to form the 2-Gigabit Fibre Channel port; and wherein the two assigned timeslots for each 2-Gigabit Fibre Channel port are at least M timeslots apart in the TDM cycle.

* * * * *